United States Patent
Jung et al.

(10) Patent No.: US 11,740,461 B2
(45) Date of Patent: Aug. 29, 2023

(54) NEAR EYE DISPLAY DEVICE INCLUDING INTERNAL REFLECTOR

(71) Applicant: Samsung Display Co., Ltd., Yongin-si (KR)

(72) Inventors: Su Bin Jung, Incheon (KR); Jae Joong Kwon, Suwon-si (KR); Jeong Woo Park, Yongin-si (KR); Ju Hwa Ha, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 300 days.

(21) Appl. No.: 16/793,933

(22) Filed: Feb. 18, 2020

(65) Prior Publication Data
US 2020/0278548 A1 Sep. 3, 2020

(30) Foreign Application Priority Data
Feb. 28, 2019 (KR) .......................... 10-2019-0023931

(51) Int. Cl.
| | |
|---|---|
| *G02B 27/01* | (2006.01) |
| *G02B 27/00* | (2006.01) |
| *G06T 19/00* | (2011.01) |
| *G02B 27/10* | (2006.01) |

(52) U.S. Cl.
CPC ....... *G02B 27/0172* (2013.01); *G02B 27/017* (2013.01); *G02B 27/0075* (2013.01); *G02B 27/108* (2013.01); *G02B 2027/013* (2013.01); *G02B 2027/014* (2013.01); *G02B 2027/0127* (2013.01); *G02B 2027/0178* (2013.01); *G06T 19/006* (2013.01)

(58) Field of Classification Search
CPC .............. G02B 27/017; G02B 27/0172; G02B 2027/0127
See application file for complete search history.

(56) References Cited

U.S. PATENT DOCUMENTS

| | | | | |
|---|---|---|---|---|
| 5,886,822 | A * | 3/1999 | Spitzer ................. | G02B 27/145 359/633 |
| 5,982,343 | A * | 11/1999 | Iba ........................ | G02B 27/143 359/630 |
| 6,671,100 | B1 * | 12/2003 | McRuer ............. | G02B 27/0081 359/630 |
| 7,639,210 | B2 * | 12/2009 | Wynne-Powell ........................... | G02B 27/4205 348/54 |
| 9,671,613 | B2 * | 6/2017 | Border ................. | G02B 27/144 |
| 9,761,051 | B2 | 9/2017 | Bromer | |
| 2007/0097019 | A1 * | 5/2007 | Wynne-Powell ...... | G02B 27/42 345/1.3 |

(Continued)

FOREIGN PATENT DOCUMENTS

| | | |
|---|---|---|
| KR | 10-1660519 B1 | 9/2016 |
| KR | 10-1830364 B1 | 2/2018 |

*Primary Examiner* — Bao-Luan Q Le
(74) *Attorney, Agent, or Firm* — Lewis Roca Rothgerber Christie LLP

(57) ABSTRACT

An optical device includes: a lens including a first surface and a plurality of side surfaces; a display device on a first side surface from among the plurality of side surfaces, the display device being configured to provide light to the first side surface; and a first reflector in the lens and configured to reflect the light provided by the display device after the light is reflected from a second side surface from among the plurality of side surfaces to the first surface.

20 Claims, 25 Drawing Sheets

(56) References Cited

U.S. PATENT DOCUMENTS

| | | | |
|---|---|---|---|
| 2010/0067110 A1* | 3/2010 | Hadad | G02B 27/0172 359/485.06 |
| 2010/0149073 A1 | 6/2010 | Chaum et al. | |
| 2010/0290124 A1* | 11/2010 | Tohara | G02B 27/0172 359/630 |
| 2014/0320971 A1* | 10/2014 | Gupta | G02B 27/0172 359/630 |
| 2016/0091719 A1* | 3/2016 | Border | G02B 27/0101 359/630 |
| 2017/0192239 A1* | 7/2017 | Nakamura | G02B 6/0036 |
| 2017/0235152 A1* | 8/2017 | Border | G02B 27/0101 359/629 |
| 2017/0285347 A1* | 10/2017 | Cai | G02B 27/0172 |
| 2017/0293143 A1* | 10/2017 | Martinez | G02B 27/0172 |
| 2018/0203229 A1* | 7/2018 | Lu | G02B 17/0856 |
| 2019/0204600 A1* | 7/2019 | Ha | G02B 27/017 |
| 2019/0204601 A1* | 7/2019 | Ha | G02B 27/017 |
| 2019/0285879 A1* | 9/2019 | Tam | G02B 17/008 |
| 2019/0285880 A1* | 9/2019 | Tam | G02B 7/12 |
| 2019/0285905 A1* | 9/2019 | Tam | G02B 17/004 |
| 2020/0004018 A1* | 1/2020 | Lee | G02B 5/3025 |
| 2020/0004023 A1* | 1/2020 | Shin | G02B 6/0016 |
| 2020/0096763 A1* | 3/2020 | Shin | G02B 27/4205 |
| 2020/0203324 A1* | 6/2020 | Shin | G02B 5/08 |
| 2020/0257124 A1* | 8/2020 | Shin | G02B 6/005 |
| 2020/0264434 A1* | 8/2020 | Shin | G03H 1/02 |
| 2021/0063742 A1* | 3/2021 | Lee | G02B 27/0176 |
| 2021/0063754 A1* | 3/2021 | Lee | G09G 3/20 |
| 2021/0065450 A1* | 3/2021 | Shin | G02B 5/124 |
| 2021/0072536 A1* | 3/2021 | Lee | G02B 27/143 |
| 2021/0199965 A1* | 7/2021 | Hwang | G02B 27/0176 |
| 2021/0199977 A1* | 7/2021 | Hwang | G02B 27/0176 |
| 2021/0199978 A1* | 7/2021 | Hwang | G02B 27/0176 |
| 2021/0208357 A1* | 7/2021 | Hwang | G09G 3/3208 |
| 2021/0333548 A1* | 10/2021 | Hwang | G02B 27/283 |
| 2021/0333549 A1* | 10/2021 | Jo | G02C 11/10 |
| 2021/0337181 A1* | 10/2021 | Shin | G02C 5/12 |
| 2021/0390783 A1* | 12/2021 | Shin | G02B 27/4205 |

* cited by examiner

ND EYE DISPLAY DEVICE INCLUDING
INTERNAL REFLECTOR

NEAR EYE DISPLAY DEVICE INCLUDING INTERNAL REFLECTOR

CROSS-REFERENCE TO RELATED APPLICATION

This application claims priority to and the benefit of Korean Patent Application No. 10-2019-0023931 filed on Feb. 28, 2019, in the Korean Intellectual Property Office, the contents of which in their entirety are herein incorporated by reference.

BACKGROUND

1. Field

The present disclosure relates to an optical device.

2. Description of the Related Art

Augmented reality is a technique of superimposing a virtual image on a real image viewed by a user's eyes and displaying the superimposed images as a single image. The virtual image may be an image in the form of text or graphics, and the real image may be information about an actual object observed in the field of view (FOV) of a device.

Augmented reality may be implemented using a head mounted display (HMD), a head-up display (HUD), or the like. When augmented reality is implemented using the head mounted display, it may be provided in the form of glasses so that the user can carry it easily, as well as put on or take off easily.

However, when augmented reality is implemented using an eye glass-type (or glasses-type) display device, a distance between a display device for displaying a virtual image and a reflector for reflecting an image from the display device and providing it to a user's eyes is small. A depth of field of the virtual image displayed by the display device may be proportional to an optical distance between the display device and the reflector.

SUMMARY

Aspects of embodiments of the present disclosure provide an optical device capable of increasing an optical distance between a display device, which displays a virtual image, and a reflector, which reflects an image from the display device, to provide the virtual image to a user's eye.

However, aspects of the present disclosure are not restricted to the one set forth herein. The above and other aspects of embodiments of the present disclosure will become more apparent to one of ordinary skill in the art to which the present disclosure pertains by referencing the detailed description of the present disclosure given below.

One or more example embodiments of the present disclosure provide an optical device including: a lens including a first surface and a plurality of side surfaces; a display device on a first side surface from among the plurality of side surfaces, the display device being configured to provide light to the first side surface; and a first reflector in the lens and configured to reflect the light provided by the display device after the light is reflected from a second side surface from among the plurality of side surfaces to the first surface.

The light provided by the display device may be reflected by a third side surface from among the plurality of side surfaces to travel toward a fourth side surface from among the plurality of side surfaces, and may be reflected by the fourth side surface to travel toward the second side surface. The third side surface may extend from a first side of the first side surface and the fourth side surface may be between the second side surface and the third side surface.

The optical device may further include an optical path changing member between the first side surface and the display device. The optical path changing member may be configured to change a path of the light provided by the display device such that the light provided by the display device travels toward the third side surface.

The optical path changing member may include: a base layer; a first light exit surface inclined at a first angle from the base layer; and a second light exit surface at a second angle from the base layer, wherein the first angle is less than the second angle.

The optical device may further include a polarizing film between the first side surface and the optical path changing member.

The optical device may further include a reflective sheet on the second side surface, the third side surface and the fourth side surface.

The first side surface may have a curved shape, and the display device may have a bent shape on the first side surface.

The optical device may further include a second reflector in the lens that is configured to reflect the light provided by the display device after the light is reflected from the second side surface to the first surface.

The first side surface and the second side surface may face away from each other.

The optical device may further include a reflective sheet on the second side surface of the lens.

The second side surface may be curved outwardly, and the reflective sheet may have a bent shape on the second side surface.

The second side surface may be curved toward a center of the lens, and the reflective sheet may have a bent shape on the second side surface.

The light provided by the display device may be incident on the first side surface, may be reflected by a second surface opposite to the first surface to travel toward the first surface, may be reflected by the first surface to travel toward the second side surface, may be reflected by the second side surface to travel toward the first surface, and may be reflected by the first surface to travel toward the first reflector.

The optical device may further include an optical path changing member between the first side surface and the display device. The optical path changing member may be configured to change a path of the light provided by the display device such that the light provided by the display device travels toward the second surface.

One or more example embodiments of the present disclosure provide an optical device including: a lens including a first lens portion, a second lens portion, and a third lens portion, the third lens portion being between the first lens portion and the second lens portion; a first display device on a first side surface of the first lens portion, the first display device being configured to provide a first light to the first side surface of the first lens portion; a second display device on a first side surface of the second lens portion, the second display device being configured to provide a second light to the first side surface of the second lens portion; a first reflector in the first lens portion and configured to reflect the second light reflected from a first side surface of the third lens portion to a first surface of the first lens portion; and a second reflector disposed in the second lens portion to reflect the first light reflected from the first side surface of the third lens portion to a first surface of the second lens portion.

The first light of the first display device may be incident on the first side surface of the first lens portion, may be reflected by a second side surface of the first lens portion to travel toward a second side surface of the third lens portion, may be reflected by the second side surface of the third lens portion to travel toward the first side surface of the third lens portion, and may be reflected by the first side surface of the third lens portion to travel toward the second reflector.

The first side surface of the third lens portion may be between the second side surface of the first lens portion and the second side surface of the second lens portion, and the second side surface of the third lens portion may be a surface opposite to the first side surface of the third lens portion.

The optical device may further include a first reflective sheet on the second side surface of the first lens portion, the second side surface of the second lens portion and the first side surface of the third lens portion; and a second reflective sheet on the second side surface of the third lens portion.

The optical device may further include a first optical path changing member between the first side surface of the first lens portion and the first display device. The first optical path changing member may be configured to change a path of the first light of the first display device such that the first light of the first display device travels toward the second side surface of the first lens portion.

The second light of the second display device may be incident on the first side surface of the second lens portion, may be reflected by the second side surface of the second lens portion to travel toward the second side surface of the third lens portion, may be reflected by the second side surface of the third lens portion to travel toward the first side surface of the third lens portion, and may be reflected by the first side surface of the third lens portion to travel toward the first reflector.

The optical device may further include a second optical path changing member between the first side surface of the second lens portion and the second display device. The second optical path changing member may be configured to change a path of the second light of the second display device such that the second light of the second display device travels toward the second side surface of the second lens portion.

The first side surface of the first lens portion may have a curved shape, and the first display device may have a bent shape on the first side surface of the first lens portion.

The first side surface of the second lens portion have a curved shape, and the second display device may have a bent shape on the first side surface of the second lens portion.

According to an embodiment of the present disclosure, after the light of the display device on the first side surface of the lens is totally reflected by at least one side surface of the lens, the light may be emitted to the first surface of the lens by the reflector and provided to the user's eye. Thus, the optical distance between the display device and the reflector can be increased. Therefore, the depth of field of the virtual image displayed on the display device can be deepened.

According to an embodiment of the present disclosure, because the optical device includes a plurality of reflectors, the luminance of the virtual image provided to the user's eye can be increased, and the area of the display device viewed by the user's eye, e.g., the field of view (FOV) of the user, can be enlarged.

According to an embodiment of the present disclosure, a reflective sheet may be disposed on the remaining side surfaces except the first side surface of the lens on which the display device is located, and the light of the device may be reflected by the reflective sheet. Therefore, the luminance of the virtual image of the display device provided to the user's eye can be increased.

According to an embodiment of the present disclosure, the display device may be a flexible display device having flexibility, and may have a bent shape on the first side surface of the lens formed as a curved surface (or may have a curved shape). Therefore, the light of the display device can travel toward the third side surface without the optical path changing layer and can be totally reflected by the third side surface.

According to an embodiment of the present disclosure, because the reflective sheet may be in a bent shape on one side surface of the lens that is formed as a curved surface, the reflective sheet may serve as a concave mirror. Accordingly, the light of the display device reflected by the reflective sheet on one side surface of the lens can be collected by the reflector. Therefore, the luminance of the virtual image of the display device provided to the user's eye can be increased by the reflector.

According to an embodiment of the present disclosure, because the reflective sheet may be in a bent shape on one side surface of the lens formed as a curved surface, the reflective sheet may serve as a convex mirror. Accordingly, the light of the display device reflected by the reflective sheet disposed on one side surface of the lens can be spread. Therefore, the virtual image of the display device provided to the user's eye by the reflector can be viewed in an enlarged manner by the user.

Aspects of embodiments of the present disclosure are not limited to the aforementioned aspects, and various other aspects are included in the present specification.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
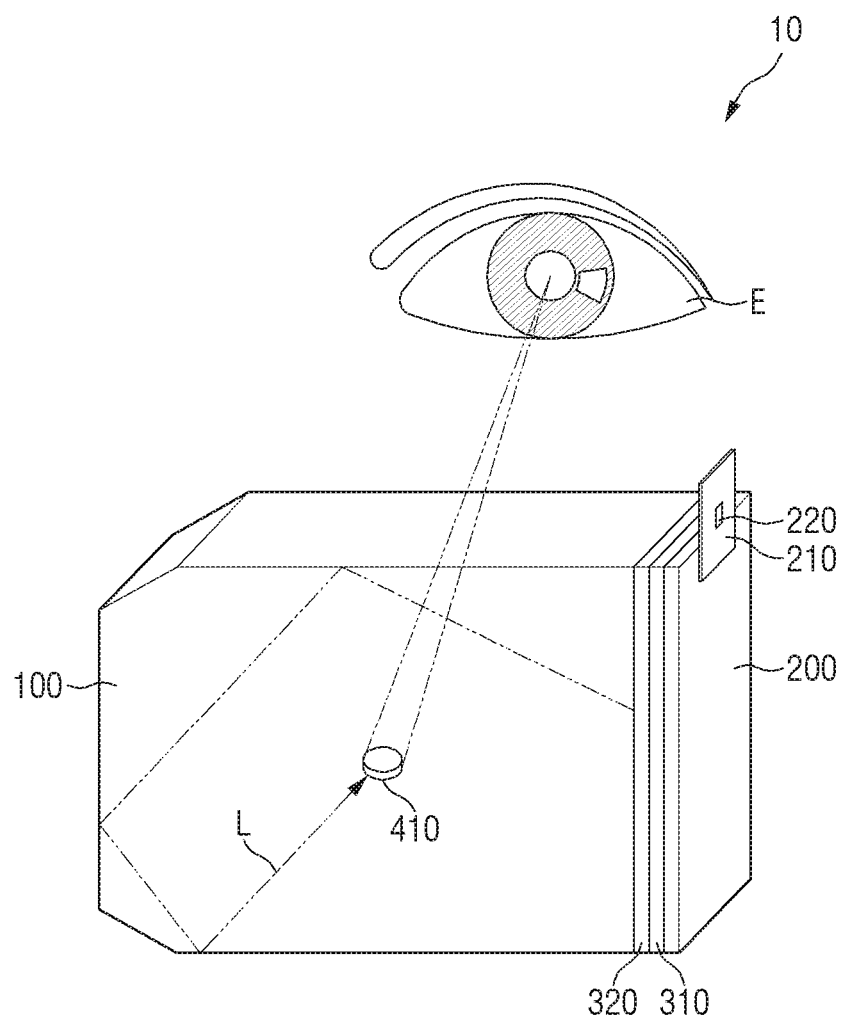
FIG. 1 is a perspective view showing an optical device according to an embodiment.

The present disclosure will now be described more fully hereinafter with reference to the accompanying drawings, in which example embodiments of the present disclosure are shown. The present disclosure may, however, be embodied in different forms and should not be construed as limited to the embodiments set forth herein. Rather, these embodiments are provided so that this disclosure will be thorough and complete, and will filly convey the aspects and features of the disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. In the drawings, the relative sizes of elements, layers, and regions may be exaggerated for clarity.

It will be understood that, although the terms "first," "second," "third," etc., may be used herein to describe various elements, components, regions, layers, and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." In addition, the use of alternative language, such as "or," when describing embodiments of the present disclosure, refers to "one or more embodiments of the present disclosure" for each corresponding item listed. As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

Hereinafter, embodiments of the present disclosure are described with reference to the attached drawings.

Figure 2A:
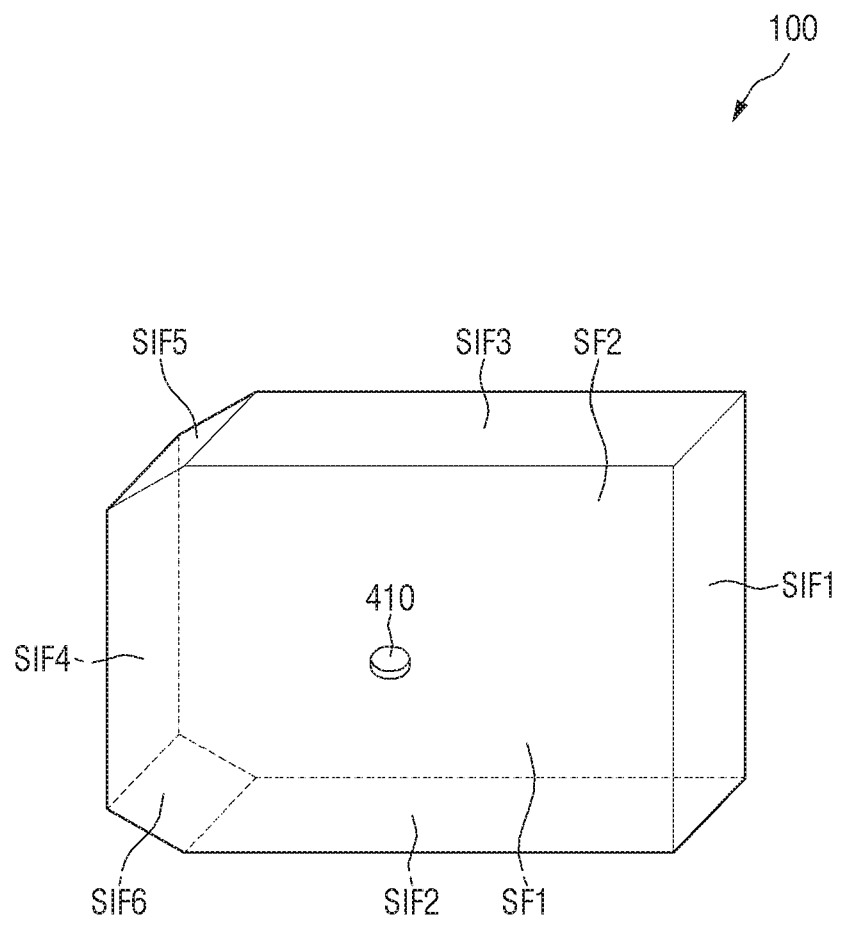
FIGS. 2A-2B are perspective views showing example embodiments of a lens of the optical device of FIG. 1.
Figure 2B:
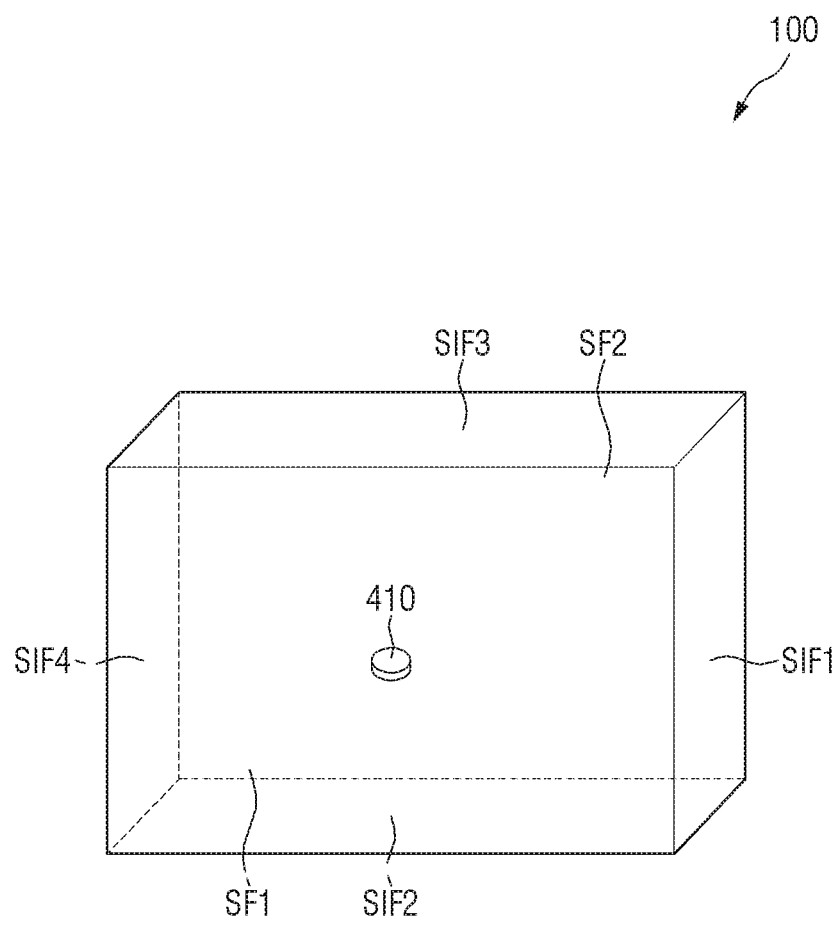
Figure 3:
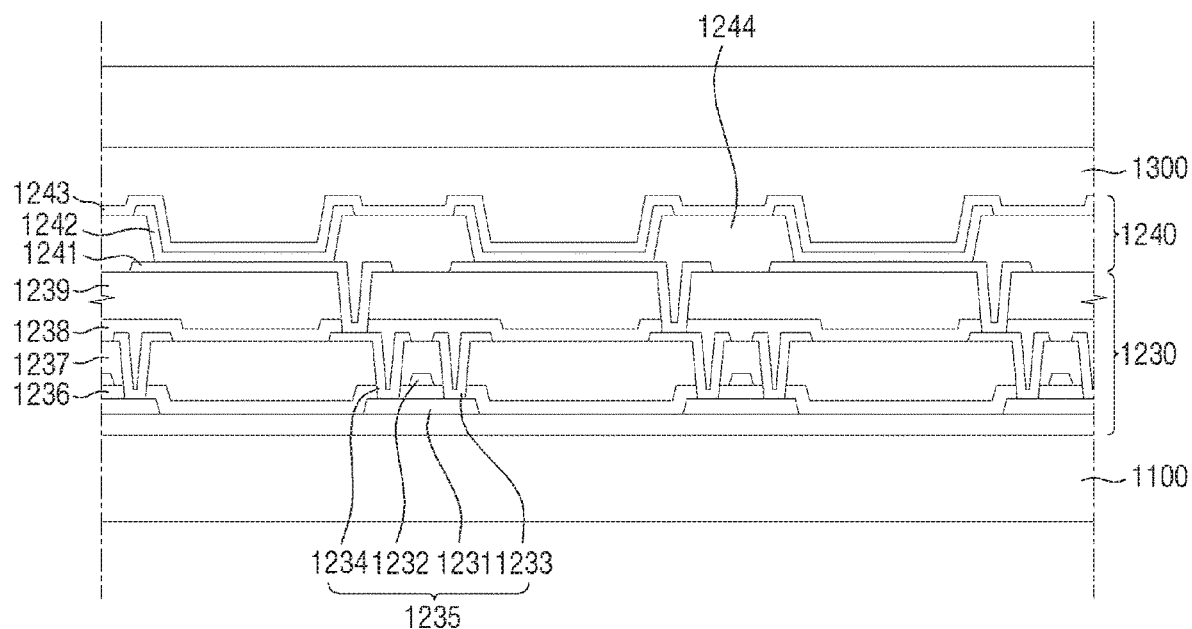
FIG. 3 is a cross-sectional view showing a display device of the optical device of FIG. 1.
Figure 4A:
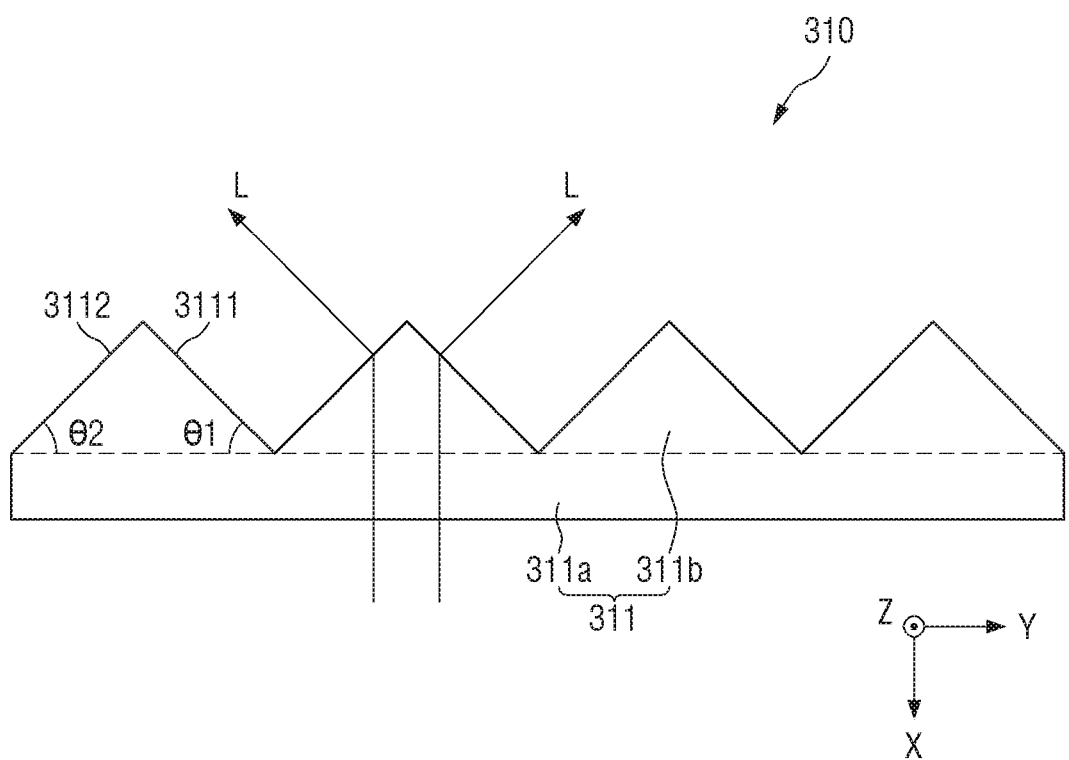
FIGS. 4A-4C show examples of an optical path changing layer of the optical device of FIG. 1.
Figure 4B:
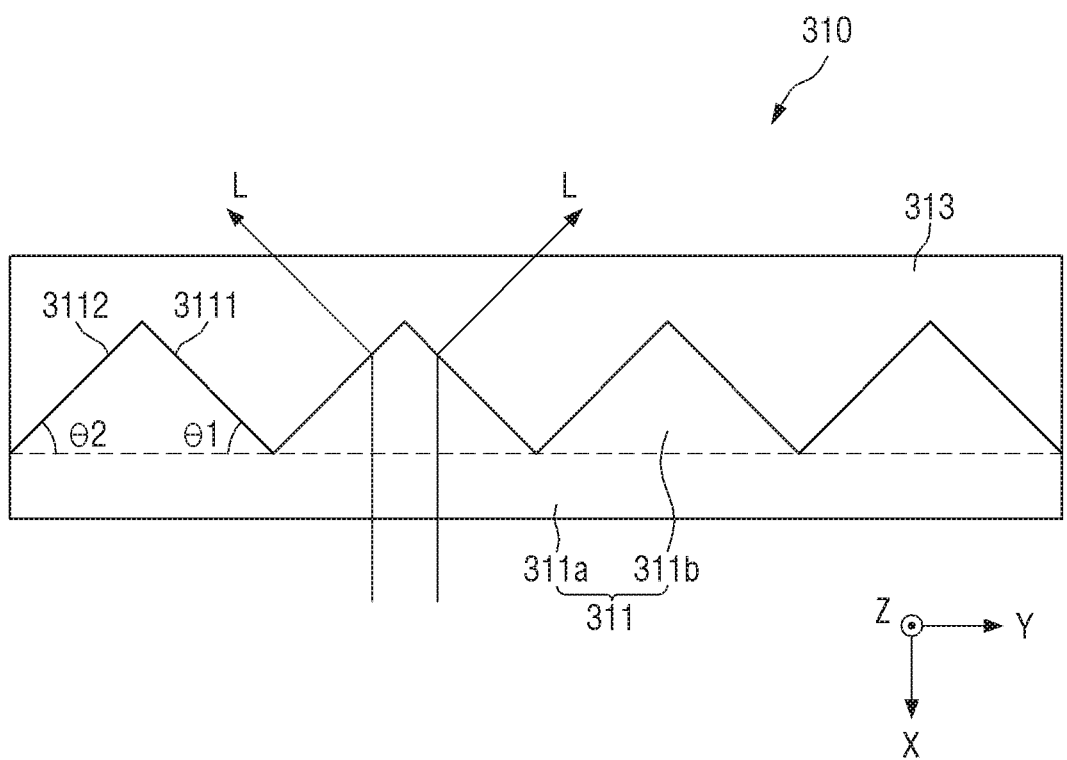
Figure 4C:
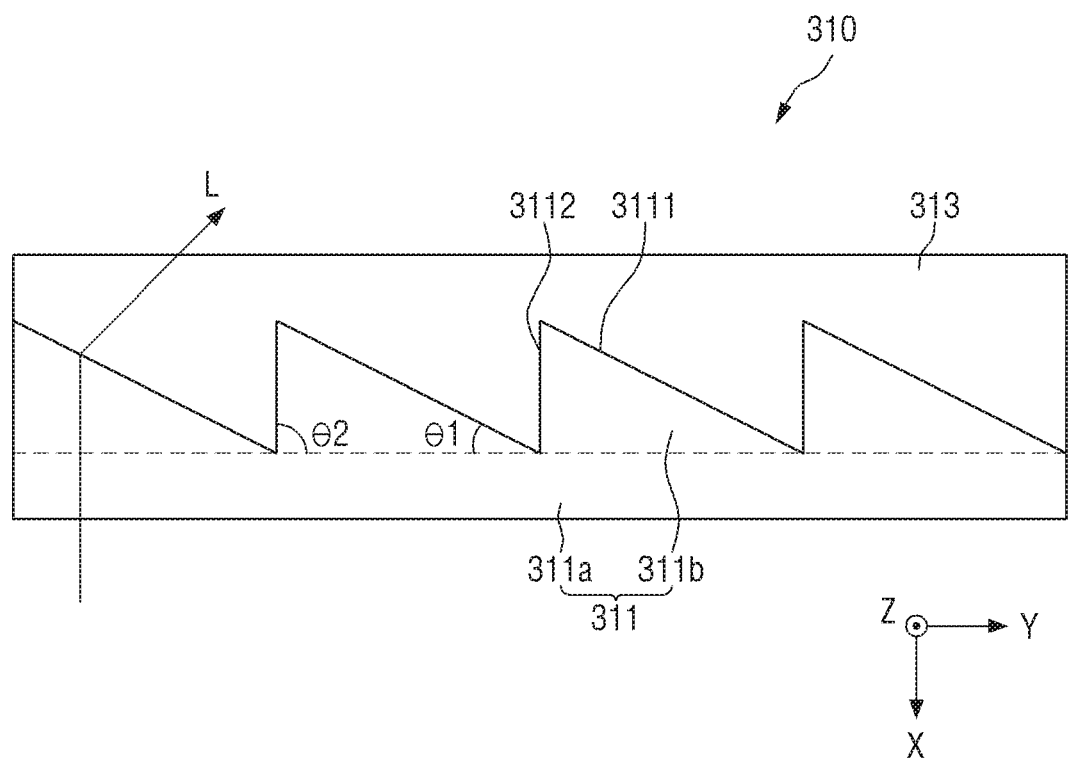

FIG. 1 is a perspective view showing an optical device 10 according to an embodiment. FIGS. 2A-2B are perspective views showing examples of a lens 100 of the optical device 10 of FIG. 1. FIG. 3 is a cross-sectional view showing a display device 200 of the optical device 10 of FIG. 1. FIGS. 4A-4C show examples of an optical path changing layer 310 of the optical device 10 of FIG. 1.

Referring to FIGS. 1, 2A-2B, 3, and 4A-4C, the optical device 10 according to an embodiment includes the lens 100, the display device 200, the optical path changing layer 310, a polarizing film 320 and a first reflector 410. The optical device 10 may be a device for providing an augmented reality or a virtual image.

The lens 100 may be formed, for example, of glass or plastic in a transparent or translucent manner. Accordingly, a user can view a real image through the lens 100. The lens 100 may have a refractive power (e.g., a predetermined refractive power) in consideration of the visual acuity of the user.

The lens 100 may be formed as an octahedron having a first surface SF1 and a second surface SF2 which may be hexagonal, a first side surface SIF1, a second side surface SIF2, a third side surface SIF3, a fourth side surface SIF4, a fifth side surface SIF5, and a sixth side surface SIF6, as shown in FIG. 2A. When the lens 100 is formed as an octahedron, as shown in FIG. 2A, the second side surface SIF2 may extend from one side (e.g., a first side) of the first side surface SIF1, and the third side surface SIF3 may extend from the other side (e.g., a second side) opposite to the first side of the first side surface SIF1. The second side surface SIF2 and the third side surface SIF3 may face each other (e.g., may face away from each other), and a length of the second side surface SIF2 in a first direction (X-axis direction) may be substantially the same as a length of the third side surface SIF3 in the first direction (X-axis direction). The fourth side surface SIF4 may be disposed between the second side surface SIF2 and the third side surface SIF3. The fifth side surface SIF5 may be disposed between the third side surface SIF3 and the fourth side surface SIF4. The sixth side surface SIF6 may be disposed between the second side surface SIF2 and the fourth side surface SIF6. The first surface SF1 may be a top surface, and the second surface SF2 may be a bottom surface. The first surface SF1, which is a surface on which an eye E of a user (e.g., a user's eye) is located (or a surface near or adjacent the eye E of the user), may be an exit surface from which light of the display device 200 is emitted by the first reflector 410. The second surface SF2 may be an outer surface of the lens 100.

Alternatively, according to embodiments, the lens 100 may be formed as a hexahedron having the first surface SF1, the second surface SF2 and the first side surface SIF1, the second side surface SIF2, the third side surface SIF3, and the fourth side surface SIF4, as shown in FIG. 2B. When the lens 100 is formed as a hexahedron as shown in FIG. 2B, the second side surface SIF2 may extend from one side (e.g., the first side) of the first side surface SIF1, the third side surface SIF3 may extend from the other side (e.g., the second side) opposite to the first side of the first side surface SIF1, and the fourth side surface SIF4 may face the first side surface SIF1. The first surface SF1 may be a top surface, and the second surface SF2 may be a bottom surface. The first surface SF1, which is a surface on which the user's eye E is located (or a surface near or adjacent the eye E of the user), may be an exit surface from which the light of the display device 200 is emitted by the first reflector 410. The second surface SF2 may be an outer surface of the lens 100.

The lens 100 is not limited to the shapes shown in FIGS. 2A-2B, and may be formed as a polyhedron having a first surface, a second surface and side surfaces, which are polygonal, for example. In addition, the lens 100 may be formed in other suitable shapes, such as a cylinder, an elliptic cylinder, a semicircular cylinder, a semi-elliptic cylinder, a distorted cylinder, or a distorted semicircular cylinder. The distorted cylinder and semicircular cylinder refer to a cylinder and a semicircular cylinder having a non-constant diameter.

The first reflector 410 is located (or disposed) in the lens 100. The first reflector 410 may be a small mirror, such as a pin mirror. Although FIG. 1 illustrates that the first reflector 410 has a circular cross section, the first reflector 410 may have any suitable shape, such as an elliptical or polygonal cross section.

The first reflector 410 may be formed to have a size that is smaller than a size of a pupil of the eye E. For example, a diameter of the first reflector 410 may range from about 500 μm to about 4 mm. According to embodiments, because the user focuses on a real image, it may be difficult for the user to recognize the first reflector 410. However, as the size of the first reflector 410 decreases, the luminance of a virtual image provided to the user's eye E by the flexible display device 200 also decreases. Therefore the size of the first reflector 410 may be set in consideration of this fact.

Figure 5:
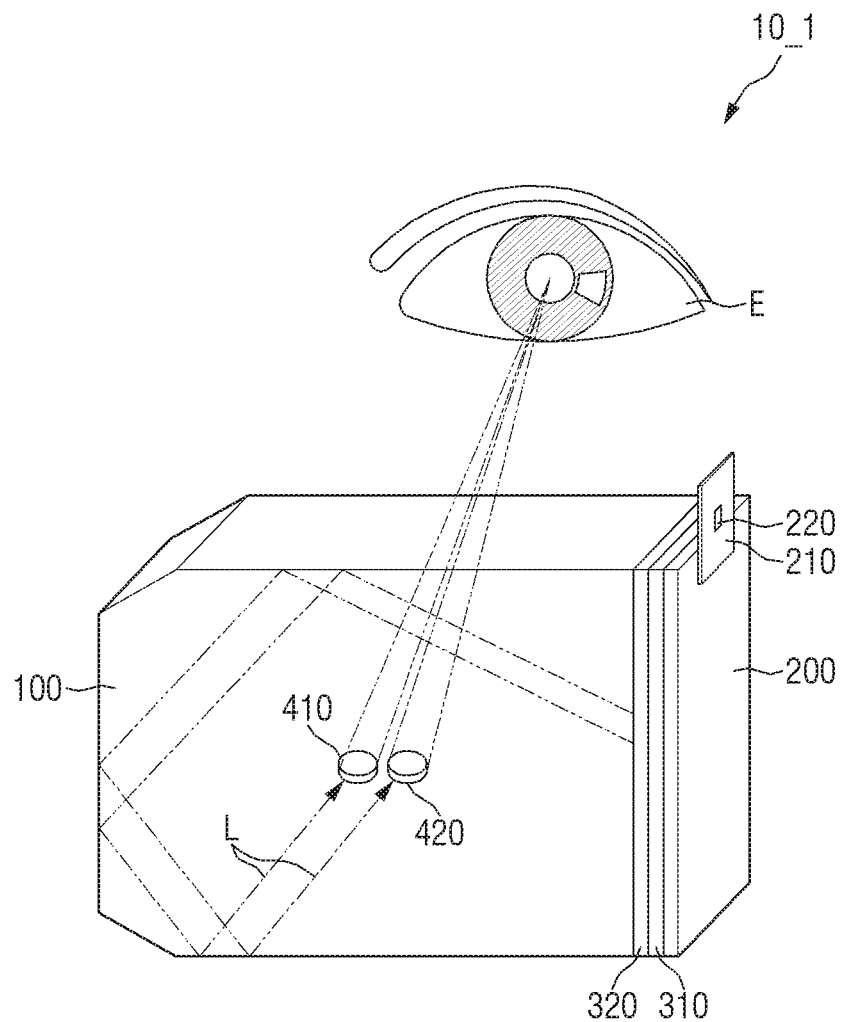
FIG. 5 is a perspective view showing an optical device according to an embodiment.

The first reflector 410 may have a cylindrical shape, as shown in FIG. 1. In some embodiments, one of the two bottom surfaces may be a reflecting surface implemented as a mirror, and the other one of the two bottom surfaces and the side surfaces may not be implemented as mirrors. In order to emit light L totally reflected from the second side surface SIF2 of the lens 100 to the first surface SF1 of the lens 100, a bottom surface of a lower portion of the first reflector 410 may be a reflecting surface, as shown in FIG. 5.

The first reflector 410 may reflect the virtual image displayed on the display device 200 and provide the virtual image to the user's eye E. Because the virtual image displayed on the display device 200 is reflected by the first reflector 410, an optical distance between the display device 200 and the first reflector 410 can be increased. Accordingly, a depth of field of the virtual image displayed on the display device 200 may be deepened.

The display device 200 displays the virtual image for realizing the augmented reality. The display device 200 may be disposed on either of the side surfaces SIF1 or SIF2 of the lens 100. For example, the display device 200 may be disposed on the first side surface SIF1 of the lens 100.

The display device 200 may be a flexible display device having flexibility, and may be configured to be bent. For example, the display device 200 may be an organic light emitting display device, as shown in FIG. 3, or an organic light emitting display device including a quantum dot.

Referring to FIG. 3, the display device 200 may include a substrate 1100, a thin film transistor layer 1230, a light emitting element layer 1240, and a thin film encapsulation layer 1300.

The thin film transistor layer 1230 is formed on the substrate 1100. The thin film transistor layer 1230 includes thin film transistors 1235, a gate insulating film 1236, an interlayer insulating film 1237, a protective film 1238, and a planarization film 1239.

A buffer film may be formed on the substrate 1100. The buffer film may be formed on the substrate 1100 to protect the thin film transistors 1235 and light emitting elements from moisture penetrating through the substrate 1100 which can be susceptible to moisture permeation. The buffer film may include a plurality of alternately stacked inorganic films. For example, the buffer film may be formed of multiple films in which one or more inorganic films of a silicon oxide film (SiOx), a silicon nitride film (SiNx), and/or SiON are alternately stacked. In some embodiments, the buffer film may be omitted.

The thin film transistors 1235 may be formed on the buffer film. Each of the thin film transistors 1235 includes an active layer 1231, a gate electrode 1232, a source electrode 1233, and a drain electrode 1234. Although FIG. 3 illustrates that each of the thin film transistors 1235 is formed by a top gate method in which the gate electrode 1232 is formed above the active layer 1231, the present disclosure is not limited thereto. For example, each of the thin film transistors 1235 may be formed by a bottom gate method in which the gate electrode 1232 is located below the active layer 1231 or a double gate method in which the gate electrode 1232 is located both above and below the active layer 1231.

The active layer 1231 may be formed on the buffer film. The active layer 1231 may be formed of a silicon-based semiconductor material or an oxide-based semiconductor material. A light shielding layer for shielding external light incident on the active layer 1231 may be formed between the buffer film and the active layer 1231.

The gate insulating film 1236 may be formed on the active layer 1231. The gate insulating film 1236 may be formed of an inorganic film, for example, a silicon oxide film (SiOx), a silicon nitride film (SiNx), or a multilayer film thereof.

The gate electrode 1232 and a gate line may be formed on the gate insulating film 1236. The gate electrode 1232 and the gate line may be formed as a single layer or multiple layers made of molybdenum (Mo), aluminum (Al), chromium (Cr), gold (Au), titanium (Ti), nickel (Ni), neodymium (Nd), and copper (Cu), or an alloy thereof.

The interlayer insulating film 1237 may be formed on the gate electrode 1232 and the gate line. The interlayer insulating film 1237 may be formed of an inorganic film, for example, a silicon oxide film (SiOx), a silicon nitride film (SiNx), or a multilayer film thereof.

The source electrode 1233, the drain electrode 1234 and a data line may be formed on the interlayer insulating film 1237. Each of the source electrode 1233 and the drain electrode 1234 may be connected to the active layer 1231 via a contact opening (or a contact hole) passing through the gate insulating film 1236 and the interlayer insulating film 1237. The source electrode 1233, the drain electrode 1234 and the data line may be formed as a single layer or multiple layers made of molybdenum (Mo), aluminum (Al), chromium (Cr), gold (Au), titanium (Ti), nickel (Ni), neodymium (Nd), and copper (Cu), or an alloy thereof.

The protective film 1238 for insulating the thin film transistor 1235 may be formed on the source electrode 1233, the drain electrode 1234 and the data line. The protective film 1238 may be formed of an inorganic film, for example, a silicon oxide film (SiOx), a silicon nitride film (SiNx), or a multilayer film thereof.

The planarization film 1239 may be formed on the protective film 1238 to flatten a step due to the thin film transistors 1235. The planarization film 1239 may be formed of an organic film such as an acryl resin, an epoxy resin, a phenolic resin, a polyamide resin, and/or a polyimide resin.

The light emitting element layer 1240 is formed on the thin film transistor layer 1230. The light emitting element layer 1240 includes light emitting elements and a pixel defining layer 1244.

The light emitting elements and the pixel defining layer 1244 are formed on the planarization film 1239. The light emitting elements may be organic light emitting diodes (or organic light emitting diode devices). For example, the light emitting elements may each include an anode electrode 1241, light emitting layers 1242, and a cathode electrode 1243.

The anode electrode 1241 may be formed on the planarization film 1239. The anode electrode 1241 may be connected to the source electrode 1233 of the thin film transistor 1235 via a contact opening (or a contact hole) passing through the protective film 1238 and the planarization film 1239.

The pixel defining layer 1244 may be formed to cover an edge of the anode electrode 1241 on the planarization film 1239 to partition the pixels. For example, the pixel defining layer 1244 may serve as a pixel defining layer for defining pixels. Each of the pixels represents a region where the anode electrode 1241, the light emitting layer 1242 and the cathode electrode 1243 are stacked sequentially and holes from the anode electrode 1241 and electrons from the cathode electrode 1243 are coupled to each other in the light emitting layer 1242 to emit light.

The light emitting layer 1242 is formed on the anode electrode 1241 and the pixel defining layer 1244. The light emitting layer 1242 may be an organic light emitting layer. The light emitting layer 1242 may emit one of red light, green light and blue light. The peak wavelength range of red light may be about 620 nm to about 750 nm, and the peak wavelength range of green light may be about 495 nm to about 570 nm. Further, the peak wavelength range of blue light may be about 450 nm to about 495 nm. Alternatively, the light emitting layer 1242 may be a white light emitting layer that emits white light. In some embodiments, the red light emitting layer, the green light emitting layer, and the blue light emitting layer may have a laminated form, and may be a common layer formed commonly to the pixels. In some embodiments, the display device 200 may further include a separate color filter for displaying a red, green or blue color.

The light emitting layer 1242 may include a hole transporting layer, a light emitting layer, and an electron transporting layer. In addition, the light emitting layer 1242 may be formed in a tandem structure of two or more stacks, in which case a charge generating layer may be formed between the stacks.

The cathode electrode 1243 is formed on the light emitting layer 1242. The cathode electrode 1243 may be formed to cover the light emitting layer 1242. The cathode electrode 1243 may be a common layer formed commonly to the pixels.

When the light emitting element layer 1240 is formed by a top emission method in which light is emitted upwardly, the anode electrode 1241 may be formed of a metal material having high reflectivity to have a laminated structure of aluminum and titanium (Ti/Al/Ti), a laminated structure of aluminum and indium tin oxide (ITO) (ITO/Al/ITO), an APC alloy, and/or a laminated structure of an APC alloy and ITO (ITO/APC/ITO). The APC alloy is an alloy of silver (Ag), palladium (Pd) and copper (Cu). Further, the cathode electrode 1243 may be formed of a transparent conductive material (TCO), such as ITO or indium zinc oxide (IZO) that can transmit light or a semi-transmissive conductive material such as magnesium (Mg), silver (Ag), or an alloy of magnesium (Mg) and silver (Ag). When the cathode electrode 1243 is formed of a semi-transmissive conductive material, the light emission efficiency can be increased by microcavity.

When the light emitting element layer 1240 is formed by a bottom emission method in which light is emitted downwardly, the anode electrode 1241 may be formed of a transparent conductive material (TCO), such as ITO or IZO, or a semi-transmissive conductive material, such as magnesium (Mg), silver (Ag), or an alloy of magnesium (Mg) and silver (Ag). The cathode electrode 1243 may be formed of a metal material having high reflectivity to have a laminated structure of aluminum and titanium (Ti/Al/Ti), a laminated structure of aluminum and ITO (ITO/Al/ITO), an APC alloy, and/or a laminated structure of an APC alloy and ITO (ITO/APC/ITO). When the anode electrode 1241 is formed of a semi-transmissive conductive material, the light emission efficiency can be increased by microcavity.

The thin film encapsulation layer 1300 is formed on the light emitting element layer 1240. The thin film encapsulation layer 1300 prevents oxygen or moisture from permeating the light emitting layer 1242 and the cathode electrode 1243, or reduces the likelihood thereof. According to embodiments, the thin film encapsulation layer 1300 may comprise at least one inorganic film. The inorganic film may be formed of silicon nitride, aluminum nitride, zirconium nitride, titanium nitride, hafnium nitride, tantalum nitride, silicon oxide, aluminum oxide, and/or titanium oxide. Further, the thin film encapsulation layer 1300 may further include at least one organic film. The organic film may be formed to have a thickness sufficient to prevent particles from penetrating the thin film encapsulation layer 1300 and being injected into the light emitting layer 1242 and the cathode electrode 1243, or to reduce the likelihood thereof. The organic film may include epoxy, acrylate and/or urethane acrylate. Instead of the thin film encapsulation layer 1300, an encapsulation substrate may be disposed on the light emitting element layer 1240.

A circuit board 210 is attached to one end (e.g., a first end) of the display device 200 (see, e.g., FIG. 1). Alternatively, the circuit board 210 may be attached to the other end (e.g., a second end) of the display device 200. Alternatively, when there are many signal lines and voltage lines for driving the display device 200, two flexible circuit boards 210 may be attached to the first end and the second end of the display device 200, respectively. The circuit board 210 may be a flexible printed circuit board.

An integrated drive circuit 220 may be mounted on the circuit board 210. The integrated drive circuit 220 may supply the display device 200 with data voltages, scan control signals, a source voltage, and the like for driving the display device 200. The integrated drive circuit 220 may be an integrated circuit.

The optical path changing layer 310 may be disposed between the first side surface SIF1 of the lens 100 and the display device 200. The optical path changing layer 310 may change the path of the light L such that the light L of the display device 200 incident on the first side surface SIF1 of the lens 100 travels toward the third side surface SIF3 of the lens 100, as shown in FIG. 1.

The optical path changing layer 310 may include a base layer 311a and an optical path changing pattern 311b disposed on the base layer 311a, as shown in FIGS. 4A-4C. The optical path changing pattern 311b may include a first light exit surface 3111 and a second light exit surface 3112.

The optical path changing pattern 311b may have a triangular side surface (or a side surface with a triangular shape). For example, the optical path changing pattern 311b may have an isosceles triangular side surface such that a first angle $\theta 1$ between an upper surface of the base layer 311a and the first light exit surface 3111 is substantially equal to a second angle $\theta 2$ between the upper surface of the base layer 311a and the second light exit surface 3112. Alternatively, the first angle $\theta 1$ may be smaller than the second angle $\theta 2$, and a length of the first light exit surface 3111 may be greater than a length of the second light exit surface 3112. For example, the optical path changing pattern 311b may have a right triangular side surface having the second angle $\theta 2$ of 90° and the first angle $\theta 1$ of 30°, as shown in FIG. 4C.

An upper planarization layer 313 may be formed on the optical path changing pattern 311b as shown in FIGS. 4B and 4C. The refractive index of the optical path changing pattern 311b may be different from the refractive index of the upper planarization layer 313.

When the optical path changing pattern 311b has an isosceles triangular side surface having the first angle $\theta 1$ and the second angle $\theta 2$, which are substantially equal to each other as shown in FIGS. 4A and 4B, the light L incident on the optical path changing pattern 311b can be refracted by the first light exit surface 3111 and the second light exit surface 3112. Accordingly, the light L incident on the optical path changing layer 310 can be diffused by the optical path changing layer 310.

When the optical path changing pattern 311b is formed such that the first angle $\theta 1$ is smaller than the second angle $\theta 2$, and the length of the first light exit surface 3111 is larger than the length of the second light exit surface 3112, as shown in FIG. 4C, the light L incident on the optical path changing pattern 311b can be refracted by the first light exit surface 3111. Therefore, most of the light L incident on the optical path changing layer 310 can be refracted in an upper right direction of the optical path changing layer 310 by the optical path changing layer 310, as shown in FIG. 4C.

The light L of the display device 200 may travel toward the third side surface SIF3 of the lens 100 by the optical path changing layer 310. When the refractive index of the lens 100 is larger than the refractive index of air and an incident angle of the light L incident on the third side surface SIF3 of the lens 100 is larger than a critical angle, the light L of the display device 200 may be totally reflected at the third side surface SIF3 of the lens 100. A part of the light L of the display device 200 that is totally reflected by the third side surface SIF3 of the lens 100 may be totally reflected by the fourth side surface SIF4 of the lens 100. A part of the light L of the display device 200 totally reflected by the fourth side surface SIF4 of the lens 100 may be totally reflected by the second side surface SIF2 of the lens 100. A part of the light L totally reflected by the second side surface SIF2 of the lens 100 may be emitted to the first surface SF1 of the lens 100 by the first reflector 410 and provided to the user's eye E.

Although FIG. 1 illustrates that after the light L of the display device 200 is totally reflected by the three side surfaces of the lens 100, the light L is reflected by the first reflector 410, emitted to the first surface SF1 of the lens 100, and provided to the user's eye E, the present disclosure is not limited thereto. For example, after the light L of the display device 200 is totally reflected by the third side surface SIF3 and the fourth side surface SIF4 of the lens 100, the light L may be emitted to the first surface SF1 of the lens 100 by the first reflector 410 and provided to the user's eye E. Alternatively, after the light L of the display device 200 is totally reflected by the third side surface SIF3 of the lens 100, the light L may be emitted to the first surface SF1 of the lens 100 by the first reflector 410 and provided to the user's eye E. Therefore, even when the user focuses on the real image through the lens 100, the user can clearly view the virtual image displayed by the display device 200. For example, even when the user does not move the focus adjusted to the real image, the user can clearly view the virtual image displayed by the display device 200.

The greater the number of the side surfaces of the lens 100 where the light L of the display device 200 is totally reflected, the deeper the depth of field of the virtual image displayed on the display device 200. However, because the loss of the light L of the display device 200 increases, the luminance of the virtual image of the display device 200 provided to the user's eye E may be reduced. Thus, the number of the side surfaces of the lens 100 where the light L of the display device 200 is totally reflected may be set in consideration of the depth of field of the virtual image displayed on the display device 200 and the luminance of the virtual image of the display device 200 provided on the user's eye E.

The polarizing film 320 may be disposed between the first side surface SIF1 of the lens 100 and the optical path changing layer 310. The polarizing film 320 may include a phase retardation film such as a linear polarizer plate and a quarter-wave ($\lambda$/4) plate. For example, a linear polarizer plate may be disposed on the first side surface SIF1 of the lens 100, and a phase retardation film may be disposed between the linear polarizer plate and the optical path changing layer 310. Accordingly, the polarizing film 320 can prevent the light from the first side surface SIF1 of the lens 100 from being reflected by the display device 200 and emitted to the first side surface SIF1 of the lens 100, while allowing the light L of the display device 200 to travel to the first side surface SIF1 of the lens 100.

According to the embodiment shown in FIGS. 1-4, after the light L of the display device 200 disposed on the first side surface SIF1 of the lens 100 is totally reflected by least one side surface of the lens 100, it may be emitted to the first surface SF1 of the lens 100 by the first reflector 410 and provided to the user's eye E. Thus, the optical distance between the display device 200 and the first reflector 410 can be increased. Therefore, the depth of field of the virtual image displayed on the display device 200 can be deepened.

FIG. 5 is a perspective view showing an optical device 10_1 according to an embodiment.

The embodiment shown in FIG. 5 differs from the embodiment shown in FIGS. 1-4 in that the optical device 10_1 includes a plurality of reflectors 410 and 420. A description overlapping with the embodiment discussed above with reference to FIGS. 1-4 may be omitted, and differences from the embodiment(s) shown in FIGS. 1-4 are mainly described below with reference to FIG. 5.

Referring to FIG. 5, the optical device 10_1 includes a plurality of reflectors 410 and 420. Although FIG. 5 illustrates that the optical device 10_1 includes two reflectors 410 and 420, the present disclosure is not limited thereto. The optical device 10_1 may include three or more reflectors, for example. As the number of reflectors increases, the luminance of the virtual image provided to the user's eye E may increase, and the area of the display device 200 viewed by the user's eye E, e.g., the field of view (FOV) of the user, may be enlarged.

The optical device 10_1 may include a first reflector 410 and a second reflector 420, as shown in FIG. 5.

The first reflector 410 and the second reflector 420 are disposed in the lens 100. The first reflector 410 and the second reflector 420 may be small mirrors, such as pin mirrors. Although FIG. 5 illustrates that the first reflector 410 and the second reflector 420 as having a circular cross section, the first reflector 410 and the second reflector 420 may have any suitable shape, such as an elliptical or polygonal cross section.

The first reflector 410 and the second reflector 420 are formed to be smaller in size than the pupil of the eye E. For example, each of the first reflector 410 and the second reflector 420 may be formed to have a diameter of about 500 μm to about 4 mm. According to embodiments, because the user focuses on the real image, it is difficult to recognize the first reflector 410 and the second reflector 420. However, as the size of the first reflector 410 and the second reflector 420 decreases, the luminance of the virtual image provided to the user's eye E by the flexible display device 200 also decreases. Thus a size of the first reflector 410 and the second reflector 420 may be set or selected in consideration of this fact.

The first reflector 410 and the second reflector 420 may have a cylindrical shape, as shown in FIG. 5. According to embodiments, one of the two bottom surfaces may be a reflecting surface implemented as a mirror, and according to embodiments the other one of the two bottom surfaces and a side surface are not implemented as a mirror. In order to emit the light L totally reflected from the second side surface SIF2 of the lens 100 to the first surface SF1 of the lens 100, the bottom surface of the first reflector 410 (e.g., a bottom surface of a lower portion of the first reflector 410) and the bottom surface of the second reflector 420 (e.g., a bottom surface of a lower portion of the second reflector 420) may be reflecting surfaces.

A part of the light L totally reflected by the second side surface SIF2 of the lens 100 may be reflected by the first reflector 410 and the second reflector 420, emitted to the first surface SF1 of the lens 100, and provided to the user's eye E. Because the virtual image displayed on the display device 200 is reflected by the first reflector 410 and the second reflector 420, its depth of field is deepened.

Although FIG. 5 illustrates that after the light L of the display device 200 is totally reflected by the three side surfaces of the lens 100, the light L is emitted to the first surface SF1 of the lens 100 by the first reflector 410 and the second reflector 402 and provided to the user's eye E, the present disclosure is not limited thereto. For example, after the light L of the display device 200 is totally reflected by the two side surfaces, e.g., the third side surface SIF3 and the fourth side surface SIF4 of the lens 100, the light L may be emitted to the first surface SF1 of the lens 100 by the first reflector 410 and the second reflector 402 and provided to the user's eye E. Alternatively, after the light L of the display device 200 is totally reflected by one side surface, e.g., the third side surface SIF3, of the lens 100, the light L may be emitted to the first surface SF1 of the lens 100 by the first reflector 410 and the second reflector 420 and provided to the user's eye E.

The greater the number of the side surfaces of the lens 100 where the light L of the display device 200 is totally reflected, the deeper the depth of field of the virtual image displayed on the display device 200. However, because the loss of the light L of the display device 200 increases, the luminance of the virtual image of the display device 200 provided to the user's eye E may be reduced. Thus, the number of the side surfaces of the lens 100 where the light L of the display device 200 is totally reflected may be set (or selected) in consideration of the depth of field of the virtual image displayed on the display device 200 and the luminance of the virtual image of the display device 200 provided on the user's eye E.

According to the embodiment shown in FIG. 5, because the optical device 10_1 includes the plurality of reflectors 410 and 420, the luminance of the virtual image provided to the user's eye E can be increased as compared with embodiments where one reflector is provided, and the area of the display device 200 viewed by the user's eye E, (e.g., the field of view (FOV) of the user), can be enlarged.

Figure 6:
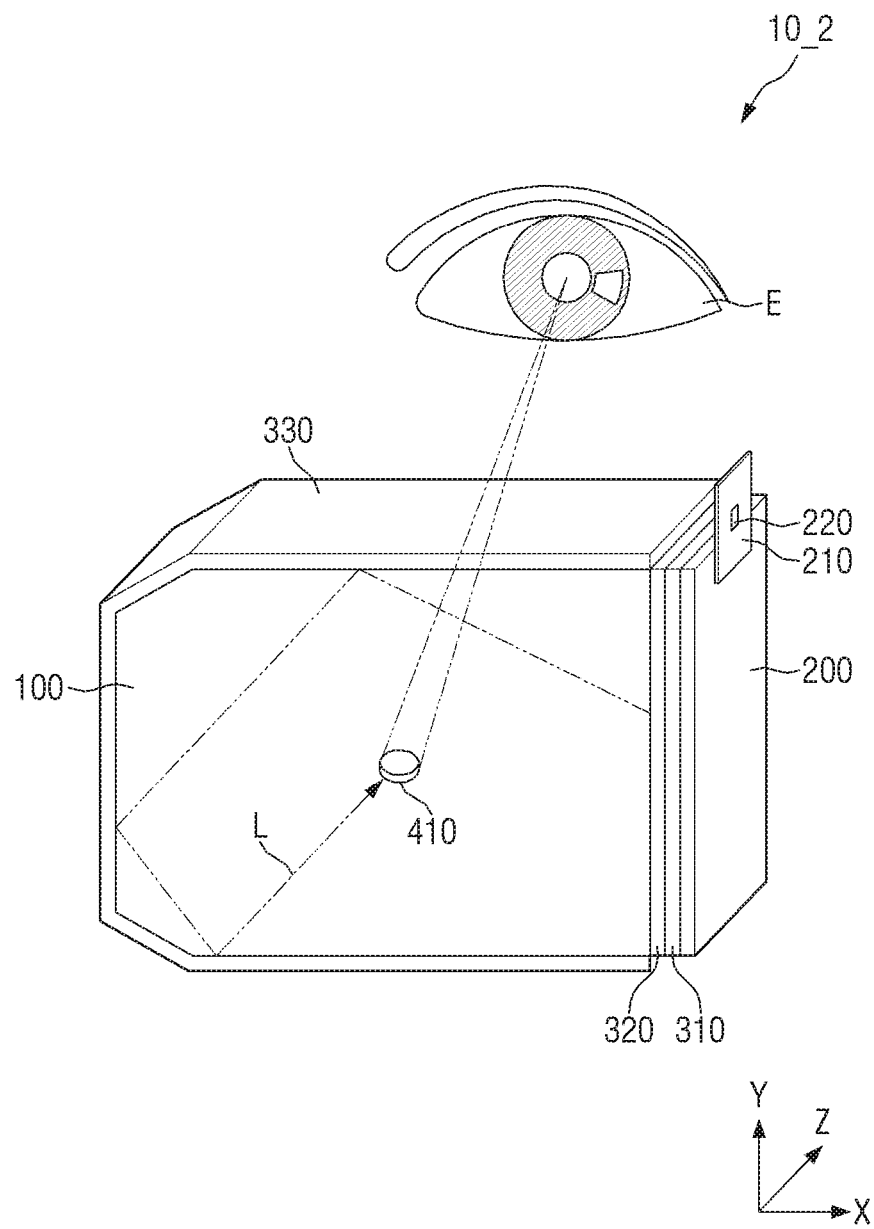
FIG. 6 is a perspective view showing an optical device according to an embodiment.

FIG. 6 is a perspective view showing an optical device 10_2 according to an embodiment.

The embodiment shown in FIG. 6 differs from the embodiment shown in FIGS. 1-4 in that a reflective sheet 330 is formed on the remaining side surfaces SIF2 to SIF6 except the first side surface SIF1 of the lens 100. A description overlapping with the embodiment described above with reference to FIGS. 1-4 may be omitted, and differences from the embodiment shown in FIGS. 1-4 are mainly described below with reference to FIG. 6.

Referring to FIG. 6, the optical device 10_2 further includes the reflective sheet 330 disposed on the second side surface SIF2, the third side surface SIF3, the fourth side surface SIF4, the fifth side surface SIF5, and the sixth side surface SIF6 of the lens 100. One surface of the reflective sheet 330 facing the second side surface SIF2, the third side surface SIF3, the fourth side surface SIF4, the fifth side surface SIF5, and the sixth side surface SIF6 of the lens 100 may be implemented as a mirror.

The light L of the display device 200 may travel toward the third side surface SIF3 of the lens 100 by the optical path changing layer 310 and may be reflected by the reflective sheet 330 disposed on the third side surface SIF3. Further, a part of the light L of the display device 200 reflected by the reflective sheet 330 disposed on the third side surface SIF3 of the lens 100 may be reflected by the reflective sheet 330 disposed on the fourth side surface SIF4 of the lens 100. Further, a part of the light L of the display device 200 reflected by the reflective sheet 330 disposed on the fourth side surface SIF4 of the lens 100 may be reflected by the reflective sheet 330 disposed on the second side surface SIF2 of the lens 100. A part of the light L of the display device 200 reflected by the reflective sheet 330 disposed on the second side surface SIF2 of the lens 100 may be emitted to the first surface SF1 of the lens 100 by the first reflector 410 and provided to the user's eye E. Therefore, even when the user focuses on the real image through the lens 100, the user can clearly view the virtual image displayed by the display device 200. Thus, even when the user does not move the focus adjusted to the real image, the user can clearly view the virtual image displayed by the display device 200.

In the embodiment shown in FIGS. 1-4, the light totally reflected by at least one side surface of the lens 100 is emitted to the first surface SF1 of the lens 100 by the first reflector 410. On the other hand, in the embodiment shown in FIG. 6, the light reflected by the reflective sheet 330 disposed on at least one side surface of the lens 100 is emitted to the first surface SF1 of the lens 100 by the first reflector 410. The total reflection occurs only when the incident angle is larger than the critical angle, whereas the reflective sheet 330 reflects the incident light almost intact. Thus, when using the reflective sheet 330, a ratio of the reflected light to the incident light can be increased as compared to embodiments when using the total reflection.

According to the embodiment shown in FIG. 6, the reflective sheet 330 is disposed on the remaining side surfaces SIF2, SIF3, SIF4, SIF5, and SIF6 (except the first side surface SIF1) of the lens 100, and the light L of the display device 200 is reflected by the reflective sheet 330. Therefore, the luminance of the virtual image of the display device 200 provided to the user's eye E can be increased.

Figure 7:
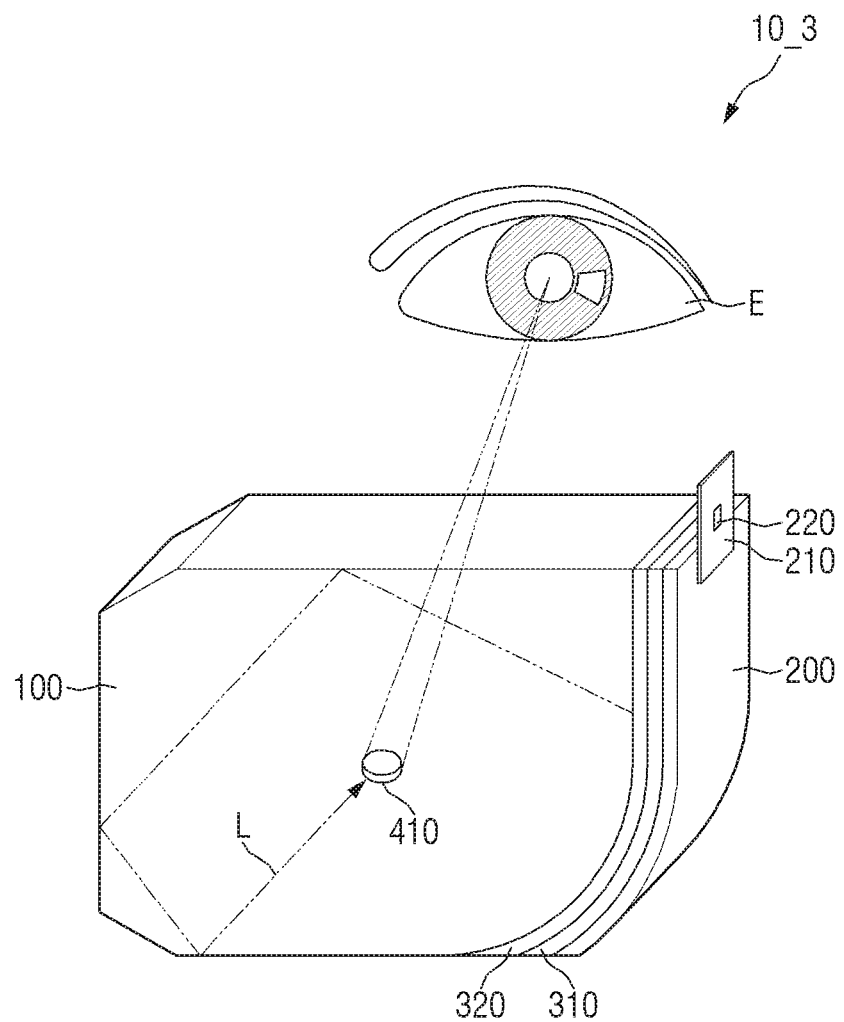
FIG. 7 is a perspective view showing an optical device according to an embodiment.

FIG. 7 is a perspective view showing an optical device 10_3 according to an embodiment.

The embodiment shown in FIG. 7 differs from the embodiment shown in FIGS. 1-4 in that the first side surface SIF1 of the lens 100 is formed as a curved surface having a predetermined curvature. A description overlapping with the embodiment described above with reference to FIGS. 1-4 may be omitted, and differences from the embodiment shown in FIGS. 1-4 are mainly described with reference to FIG. 7.

Referring to FIG. 7, the first side surface SIF1 of the lens 100 may be a curved surface, e.g., may have a curved shape having a predetermined curvature. The first side surface SIF1 of the lens 100 may have a curved shape in an outward direction (e.g., the first direction (X-axis direction)) of the first side surface SIF1. Accordingly, a part of the first side surface SIF1 of the lens 100 may face a part of the third side surface SIF3.

The display device 200 may be a flexible display device with flexibility, which can be bent. Thus, the display device 200 may be disposed in a bent shape on the first side surface SIF1 of the lens 100 formed as a curved surface. Because a part of the first side surface SIF1 of the lens 100 may face a part of the third side surface SIF3 of the lens 100, the light L of the display device 200 may travel toward the third side surface SIF3 and may be totally reflected by the third side surface SIF3. Therefore, the optical path changing layer 310 may be omitted.

Although FIG. 7 illustrates that first side surface SIF1 of the lens 100 is formed as a curved surface, the present disclosure is not limited thereto. For example, when the length of the second side surface SIF2 of the lens 100 in the first direction (X-axis direction) is shorter than the length of the third side surface SIF3 of the lens 100 in the first direction (X-axis direction), the first side surface SIF1 may be disposed obliquely such that a part of the first side surface SIF1 of the lens 100 may face a part of the third side surface SIF3. According to embodiments, the first side surface SIF1 may be formed as a flat surface rather than a curved surface.

According to the embodiment shown in FIG. 7, the display device 200 is a flexible display device having flexibility, and may be disposed in a bent shape on the first side surface SIF1 of the lens 100 formed as a curved surface. Therefore, the light L of the display device 200 can travel toward the third side surface SIF3 without the optical path changing layer 310 and can be totally reflected by the third side surface SIF3.

Figure 8:
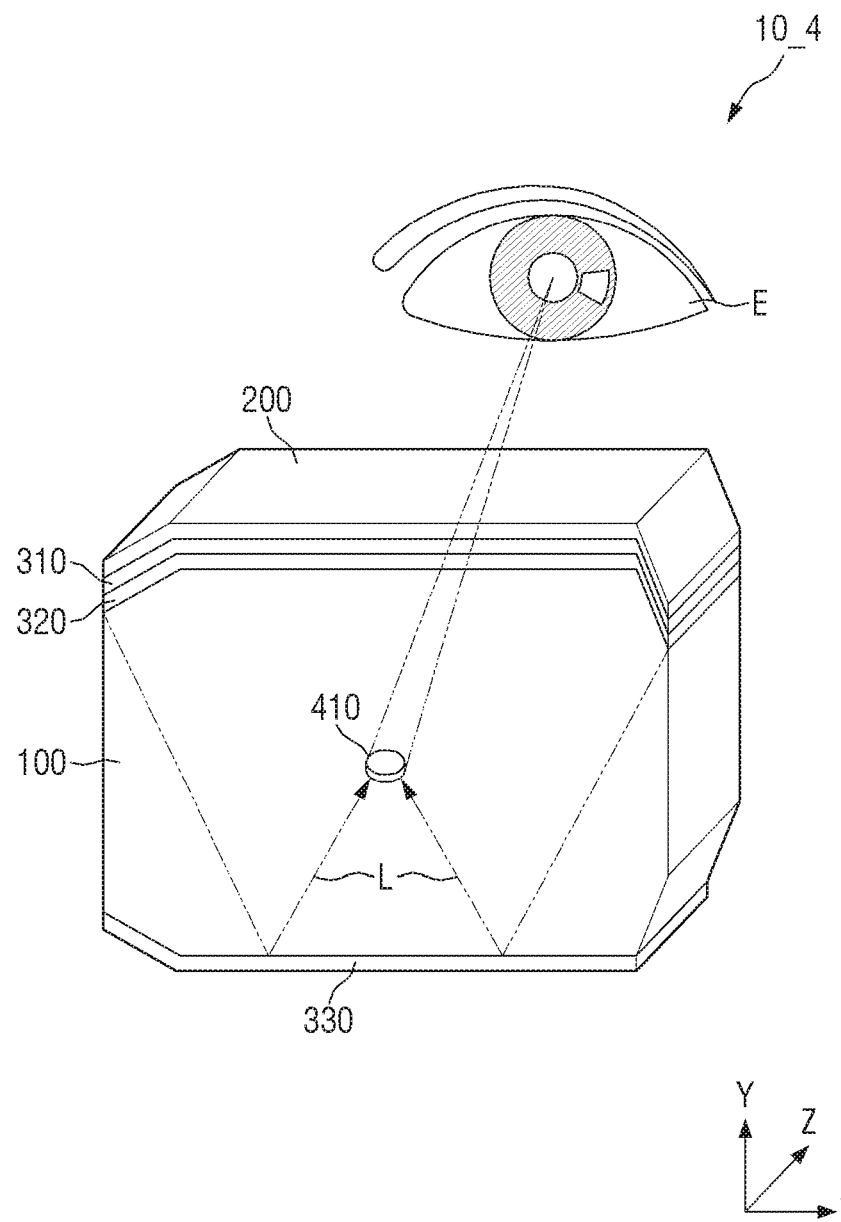
FIG. 8 is a perspective view showing an optical device according to an embodiment.
Figure 9:
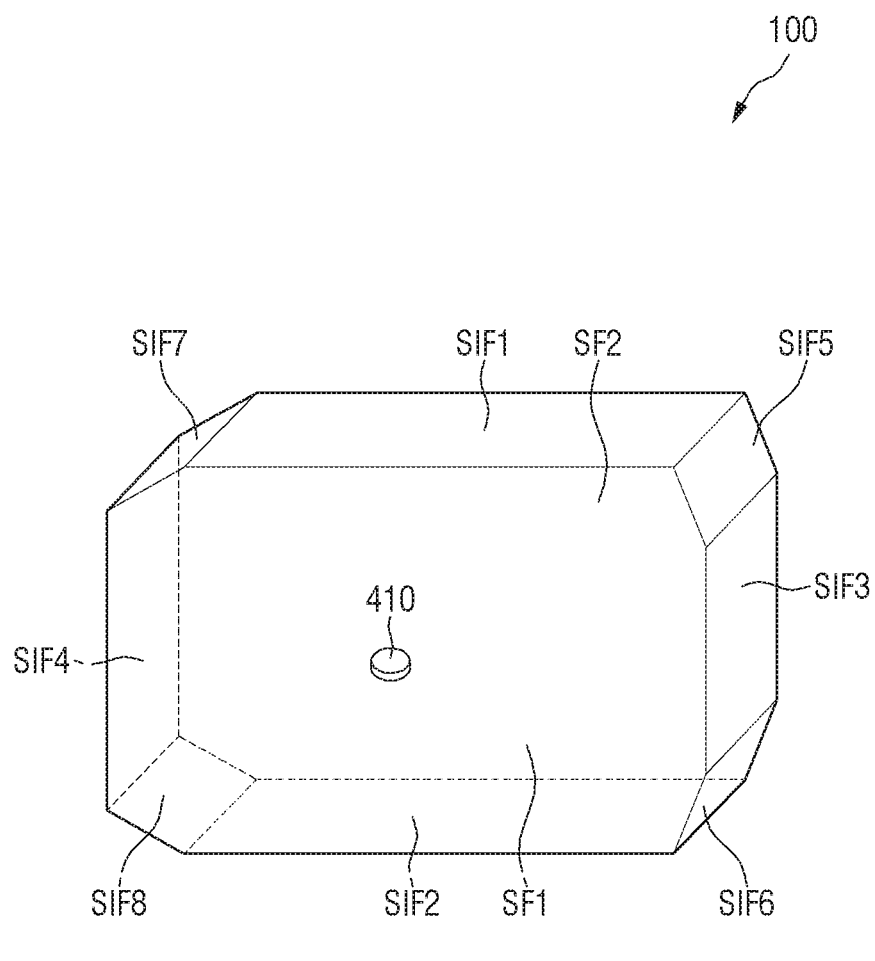
FIG. 9 is a perspective view showing an example embodiment of a lens of the optical device of FIG. 8.
Figure 10:
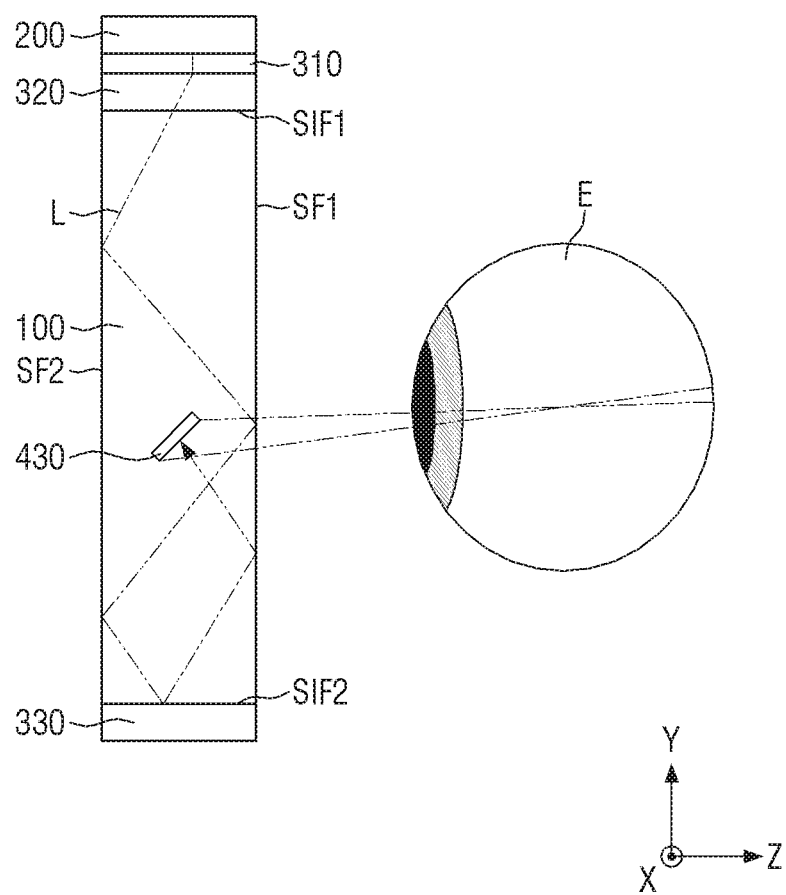
FIG. 10 is a side view showing an example of an optical path of the optical device of FIG. 8.
Figure 11:
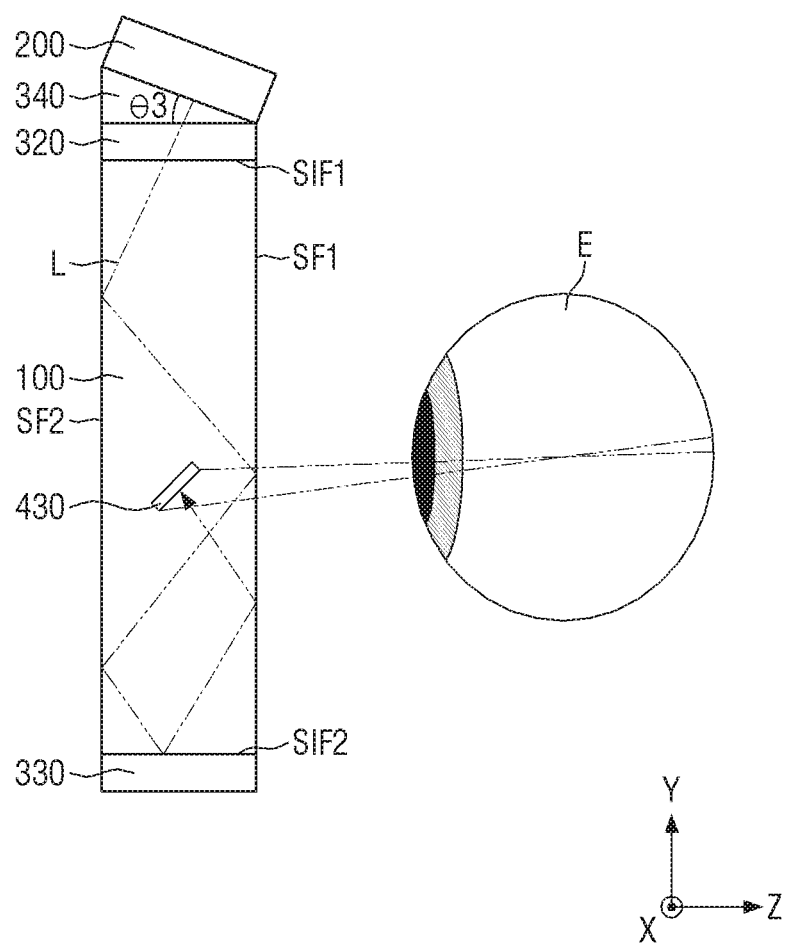
FIG. 11 is a side view showing an example of an optical path of the optical device of FIG. 8.

FIG. 8 is a perspective view showing an optical device 10_4 according to an embodiment. FIG. 9 is a perspective view showing an example of a lens 100 of the optical device 10_4 of FIG. 8. FIG. 10 is a side view showing an example of an optical path of the optical device 10_4 of FIG. 8. FIG. 11 is a side view showing an example of an optical path of the optical device 10_4 of FIG. 8.

The embodiment shown in FIGS. 8-11 differs from the embodiment shown in FIGS. 1-4 in that after the light L of the display device 200 disposed on the first side surface SIF1 of the lens 100 is reflected by the reflective sheet 330 disposed on the second side surface SIF2 facing the first side surface SIF1 of the lens 100, the light L is reflected by the first reflector 410 and emitted to the first surface SF1 of the lens 100. A description overlapping with the embodiment described above with reference to FIGS. 1-4 may be omitted, and differences from the embodiment shown in FIGS. 1-4 are mainly described with reference to FIGS. 8-11.

Referring to FIGS. 8-11, the lens 100 may be formed in a decahedral shape including a first surface SF1 and a second surface SF2 which are octagonal and a first side surface SIF1, a second side surface SIF2, a third side surface SIF3, a fourth side surface SIF4, a fifth side surface SIF5, a sixth side surface SIF6, a seventh side surface SIF7, and an eighth side surface SIF8. When the lens 100 is formed in a decahedral shape, as shown in FIG. 9, the first side surface SIF1 and the second side surface SIF2 may face each other (e.g., may face away from each other), the third side surface SIF3 may be disposed between one side of the first side surface SIF1 and one side of the second side surface SIF2, and the fourth side surface SIF4 may be disposed between the other side of the first side surface SIF1 and the other side of the second side surface SIF2. The fifth side surface SIF5 may be disposed between the first side surface SIF1 and the third side surface SIF3, and the sixth side surface SIF6 may be disposed between the second side surface SIF2 and the third side surface SIF3. The seventh side surface SIF7 may be disposed between the first side surface SIF1 and the fourth side surface SIF4, and the eighth side surface SIF8 may be disposed between the second side surface SIF2 and the fourth side surface SIF4. The first surface SF1, which is a surface on which the user's eye E is located (or a surface near or adjacent the eye E of the user), may be an exit surface from which the light of the display device 200 is emitted by the first reflector 410. The second surface SF2 may be an outer surface of the lens 100.

The lens 100 is not limited to that shown in FIG. 9, and may be formed as a polyhedron having a first surface, a second surface and side surfaces, which are polygonal, for example. In addition to the polyhedron, the lens 100 may be formed in other suitable shapes, such as a cylinder, an elliptic cylinder, a semicircular cylinder, a semi-elliptic cylinder, a distorted cylinder, or a distorted semicircular cylinder. The distorted cylinder and the distorted semicircular cylinder refer to a cylinder and a semicircular cylinder having a non-constant diameter.

The optical path changing layer 310 may change the path of the light L such that the light L of the display device 200 incident on the first side surface SIF1 of the lens 100 travels toward the second surface SF2 of the lens 100, as shown in FIG. 10.

Alternatively, as shown in FIG. 11, instead of the optical path changing layer 310, an inclination layer 340 for arranging the display device 200 to be inclined by a third angle θ3 with respect to the first side surface SIF1 of the lens 100 may be disposed between the first side surface SIF1 of the lens 100 and the display device 200. The third angle θ3 indicates an angle that is inclined in a second direction (Y-axis direction) with respect to a direction opposite to a third direction (Z-axis direction).

The reflective sheet 330 may be disposed on the second side surface SIF2 of the lens 100. One surface of the reflective sheet 330 facing the second side surface SIF2 of the lens 100 may be implemented as a mirror. The reflective sheet 330 may be formed flat in the first direction (X-axis direction) and the third direction (Z-axis direction).

As shown in FIGS. 10-11, the light L of the display device 200 may travel toward the second surface SF2 of the lens 100. When the refractive index of the lens 100 is larger than the refractive index of air and the incident angle of the light L incident on the second surface SF2 of the lens 100 is larger than a critical angle, the light L of the display device 200 may be totally reflected at the second surface SF2 of the lens 100. A part of the light L totally reflected by the second surface SF2 of the lens 100 may be totally reflected by the first surface SF1 of the lens 100. A part of the light L totally reflected by the first surface SF1 of the lens 100 may be totally reflected again by the second surface SF2 of the lens 100. A part of the light L totally reflected again by the second surface SF2 of the lens 100 may be reflected by the reflective sheet 330 disposed on the second side surface SIF2 of the lens 100. A part of the light L reflected by the reflective sheet 330 disposed on the second side surface SIF2 of the lens 100 may be totally reflected again by the first surface SF1 of the lens 100. A part of the light L totally reflected again by the first surface SF1 of the lens 100 may be emitted to the first surface SF1 of the lens 100 by the first reflector 410 and provided to the user's eye E. Therefore, even when the user focuses on the real image through the lens 100, the user can clearly view the virtual image displayed by the display device 200. That is, even when the user does not move the focus adjusted to the real image, the user can clearly view the virtual image displayed by the display device 200.

According to the embodiment shown in FIGS. 8-11, after the light of the display device 200 disposed on the first side surface SIF1 of the lens 100 is totally reflected by least one side surface of the lens 100, it may be emitted to the first surface SF1 of the lens 100 by the first reflector 410 and provided to the user's eye E. Thus, the optical distance between the display device 200 and the first reflector 410 can be increased. Therefore, the depth of field of the virtual image displayed on the display device 200 can be deepened.

Figure 12:
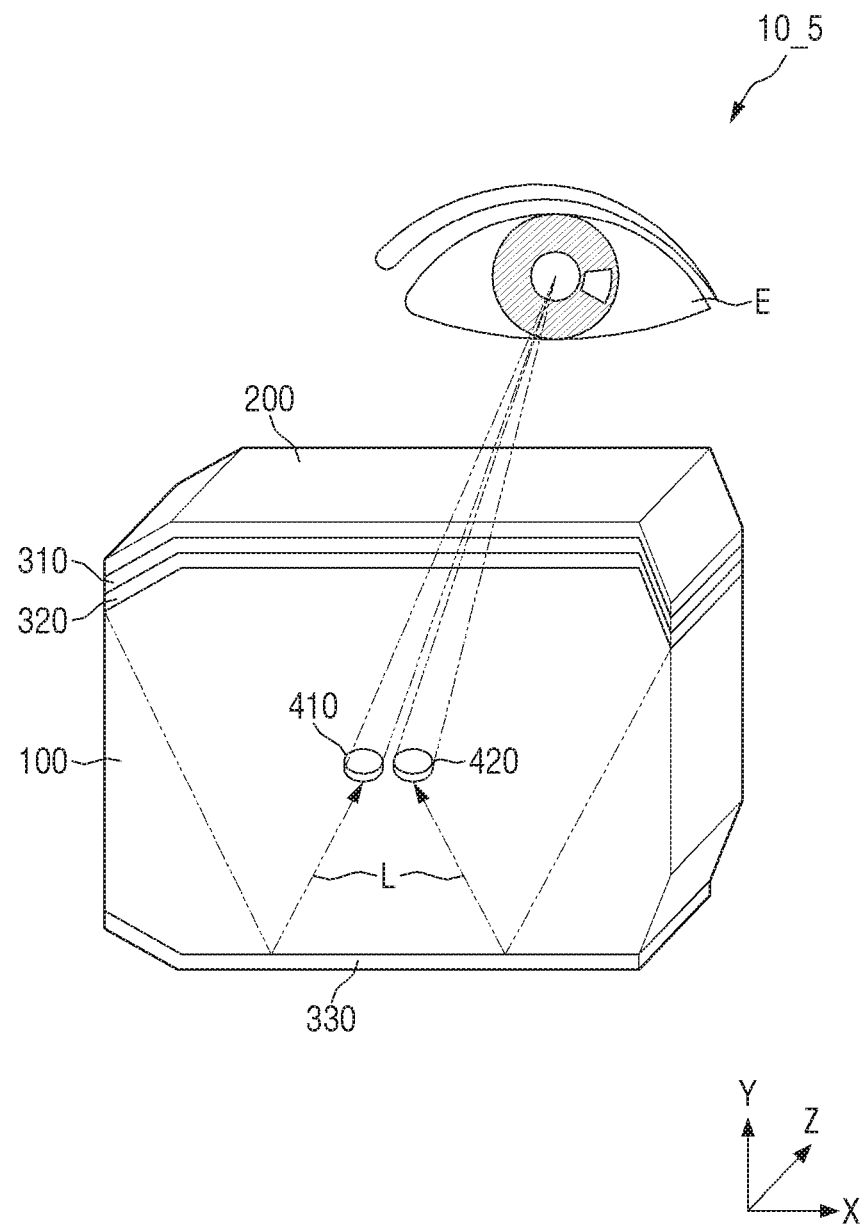
FIG. 12 is a perspective view showing an optical device according to an embodiment.

FIG. 12 is a perspective view showing an optical device 10_5 according to an embodiment.

The embodiment shown in FIG. 12 differs from the embodiment shown in FIGS. 8-11 in that the optical device 10_5 includes a plurality of reflectors 410 and 420. A description overlapping with the embodiment described above with reference to FIGS. 8-11 may be omitted, and differences from the embodiment shown in FIGS. 8-11 are mainly described with reference to FIG. 12.

Referring to FIG. 12, the optical device 10_5 includes a plurality of reflectors 410 and 420. Although FIG. 12 illustrates that the optical device 10_5 includes two reflectors 410 and 420, the present disclosure is not limited thereto. The optical device 10_5 may include three or more reflectors, for example. As the number of reflectors increases, the luminance of the virtual image provided to the user's eye E may increase, and the area of the display device 200 viewed by the user's eye E, e.g., the field of view (FOV) of the user, may be enlarged.

The optical device 10 may include a first reflector 410 and a second reflector 420, as shown in FIG. 12.

The first reflector 410 and the second reflector 420 are disposed in the lens 100. The first reflector 410 and the second reflector 420 may be small mirrors, such as pin mirrors. Although FIG. 12 illustrates that the first reflector 410 and the second reflector 420 have a circular cross section, they may have any suitable shape, such as an elliptical or polygonal cross section.

The first reflector 410 and the second reflector 420 are formed to be smaller in size than the pupil of the eye E. For example, each of the first reflector 410 and the second reflector 420 may be formed to have a diameter of about 500 μm to about 4 mm. In this case, since the user focuses on the real image, it is difficult to recognize the first reflector 410 and the second reflector 420. However, as the size of the first reflector 410 and the second reflector 420 decreases, the luminance of the virtual image provided to the user's eye E by the flexible display device 200 also decreases. Thus, in consideration of this fact, the size of the first reflector 410 and the second reflector 420 may be set.

The first reflector 410 and the second reflector 420 may have a cylindrical shape, as shown in FIG. 5. In embodiments, one of the two bottom surfaces may be a reflecting surface implemented as a mirror, and the other one of the two bottom surfaces and the side surface may not be implemented as a mirror. In order to emit the light L totally reflected from the second side surface SIF2 of the lens 100 to the first surface SF1 of the lens 100, the bottom surface of a lower portion of the first reflector 410 and the bottom surface of a lower portion of the second reflector 420 may be reflecting surfaces.

A part of the light L totally reflected by the second side surface SIF2 of the lens 100 may be reflected by the first reflector 410 and the second reflector 420, emitted to the first surface SF1 of the lens 100, and provided to the user's eye E. Because the virtual image displayed on the display device 200 is reflected by the first reflector 410 and the second reflector 420, its depth of field is deepened.

According to the embodiment shown in FIG. 12, because the optical device 10_5 includes the plurality of reflectors 410 and 420, the luminance of the virtual image provided to the user's eye E can be increased as compared with embodiments where one reflector is provided, and the area of the display device 200 viewed by the user's eye E, e.g., the field of view (FOV) of the user, can be enlarged.

Figure 13:
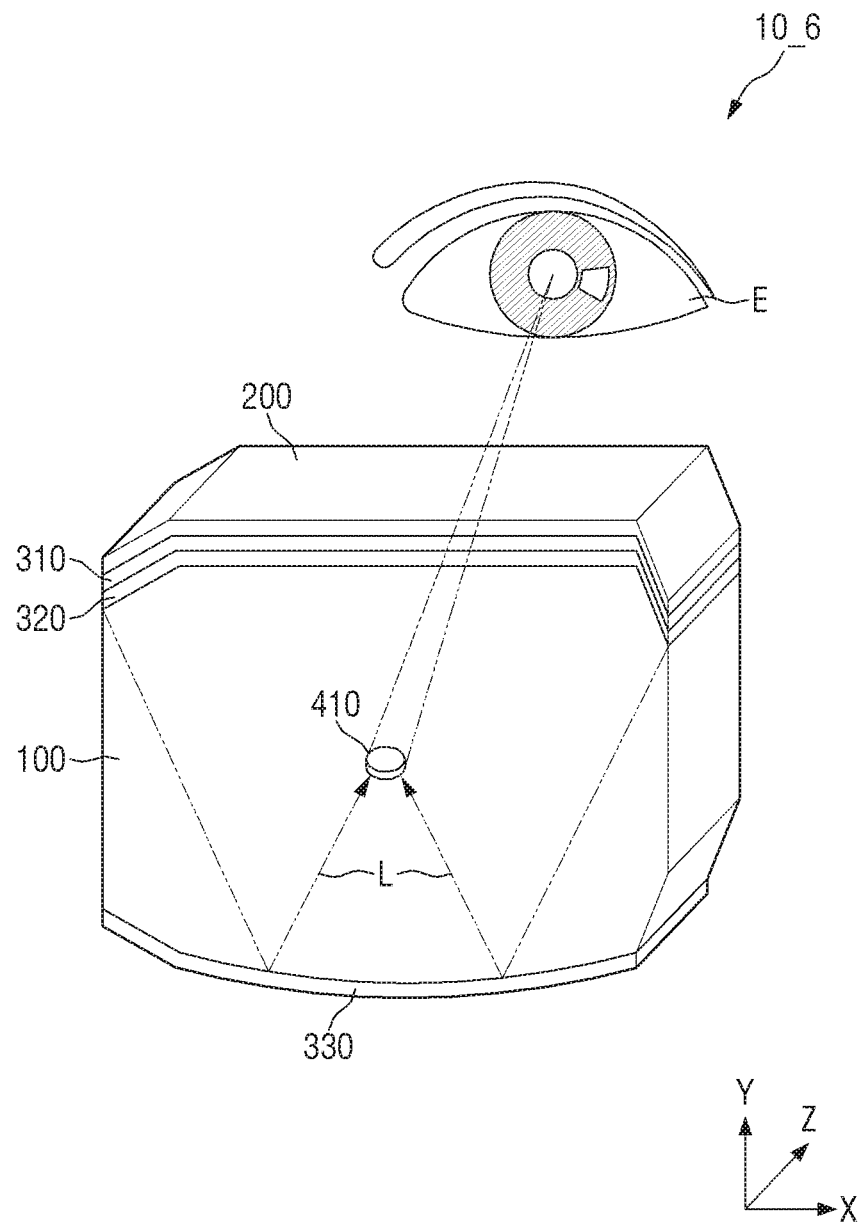
FIG. 13 is a perspective view showing an optical device according to an embodiment.

FIG. 13 is a perspective view showing an optical device 10_6 according to an embodiment.

The embodiment shown in FIG. 13 differs from the embodiment shown in FIGS. 8-11 in that the second side surface SIF2 of the lens 100 is formed as a curved surface, e.g., a curved surface having a predetermined curvature. A description overlapping with the embodiment described above with reference to FIGS. 8-11 may be omitted, and differences from the embodiment shown in FIGS. 8-11 is mainly described below with reference to FIG. 13.

Referring to FIG. 13, the second side surface SIF2 of the lens 100 may be a curved surface having a predetermined curvature. The second side surface SIF2 of the lens 100 may have a curved shape in an outward direction (e.g., a direction opposite to the second direction (Y-axis direction)) of the second side surface SIF2.

Because the reflective sheet 330 is disposed on the second side surface SIF2 of the lens 100, it may be arranged in a curved shape along the curvature of the second side surface SIF2 of the lens 100. Because the second side surface SIF2 of the lens 100 is curved in the outward direction (e.g., a direction opposite to the second direction (Y-axis direction)) of the second side surface SIF2, the reflective sheet 330 may serve as a concave mirror. Accordingly, the light L of the display device 200 reflected by the reflective sheet 330 disposed on the second side surface SIF2 of the lens 100 can be collected by the first reflector 410. Therefore, the luminance of the virtual image of the display device 200 provided to the user's eye E can be increased by the first reflector 410.

According to the embodiment shown in FIG. 13, because the reflective sheet 330 is arranged in a curved shape on the second side surface SIF2 of the lens 100 which is formed as a curved surface, the reflective sheet 330 may serve as a concave mirror. Accordingly, the light L of the display device 200 reflected by the reflective sheet 330 disposed on the second side surface SIF2 of the lens 100 can be collected by the first reflector 410. Therefore, the luminance of the virtual image of the display device 200 provided to the user's eye E can be increased by the first reflector 410.

Figure 14:
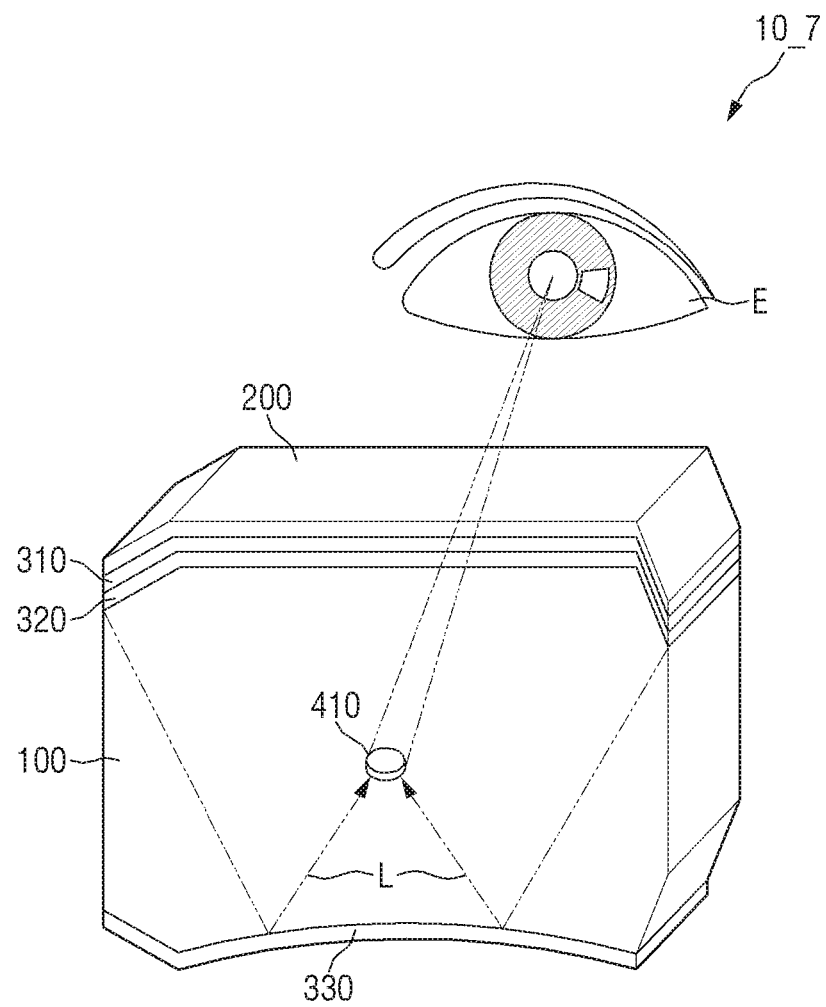
FIG. 14 is a perspective view showing an optical device according to an embodiment.

FIG. 14 is a perspective view showing an optical device 10_7 according to an embodiment.

The embodiment shown in FIG. 14 differs from the embodiment shown in FIGS. 8-11 in that the second side surface SIF2 of the lens 100 is formed as a curved surface having a curvature, e.g., a predetermined curvature. A description overlapping with the embodiment described above with reference to FIGS. 8-11 may be omitted, and differences from the embodiment shown in FIGS. 8-11 are mainly described with reference to FIG. 14.

Referring to FIG. 14, the second side surface SIF2 of the lens 100 may be a curved surface having a predetermined curvature. The second side surface SIF2 of the lens 100 may have a curved shape toward the center of the lens 100 (e.g., in the second direction (Y-axis direction)).

Because the reflective sheet 330 is disposed on the second side surface SIF2 of the lens 100, it may be arranged in a curved shape along the curvature of the second side surface SIF2 of the lens 100. Because the second side surface SIF2 of the lens 100 is curved toward the center of the lens 100 (e.g., in the second direction (Y-axis direction)), the reflective sheet 330 may serve as a convex mirror. Accordingly, the light L of the display device 200 reflected by the reflective sheet 330 disposed on the second side surface SIF2 of the lens 100 is spread. Therefore, the virtual image of the display device 200 provided to the user's eye E by the first reflector 410 can be viewed in an enlarged manner by the user.

According to the embodiment shown in FIG. 14, because the reflective sheet 330 is arranged in a curved shape on the second side surface SIF2 of the lens 100 which is formed as a curved surface, the reflective sheet 330 may serve as a convex mirror. Accordingly, the light L of the display device 200 reflected by the reflective sheet 330 disposed on the second side surface SIF2 of the lens 100 can be spread. Therefore, the virtual image of the display device 200 provided to the user's eye E by the first reflector 410 can be viewed in an enlarged manner by the user.

Figure 15:
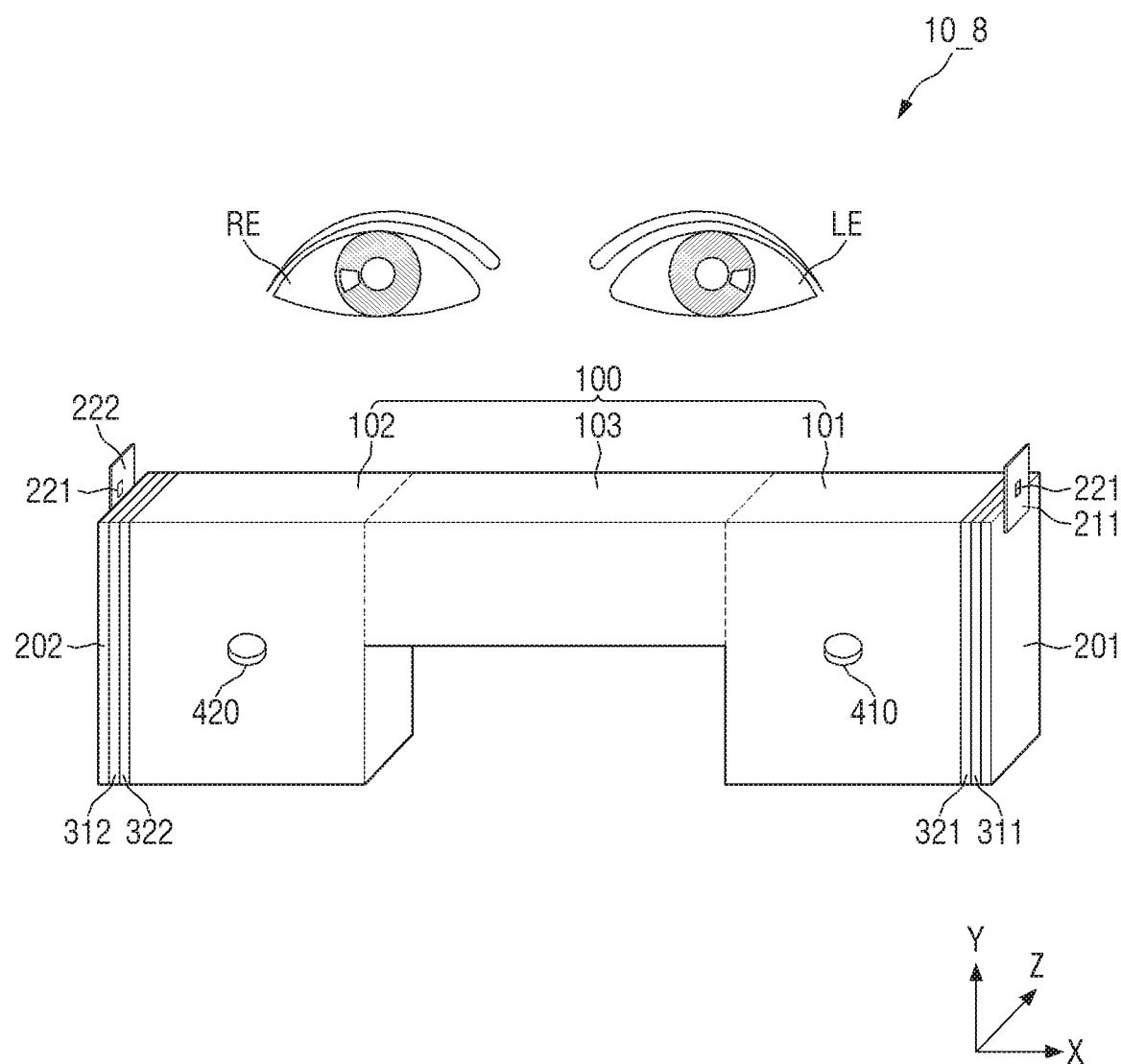
FIG. 15 is a perspective view showing an optical device according to an embodiment.
Figure 16:
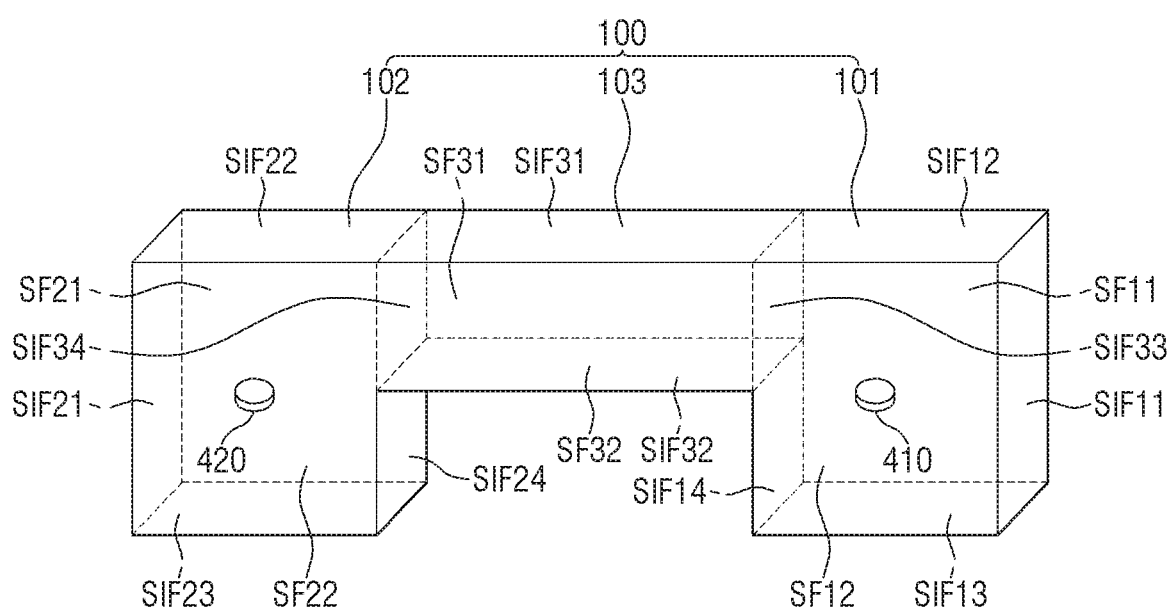
FIG. 16 is a perspective view showing an example of a lens of the optical device of FIG. 15.
Figure 17:
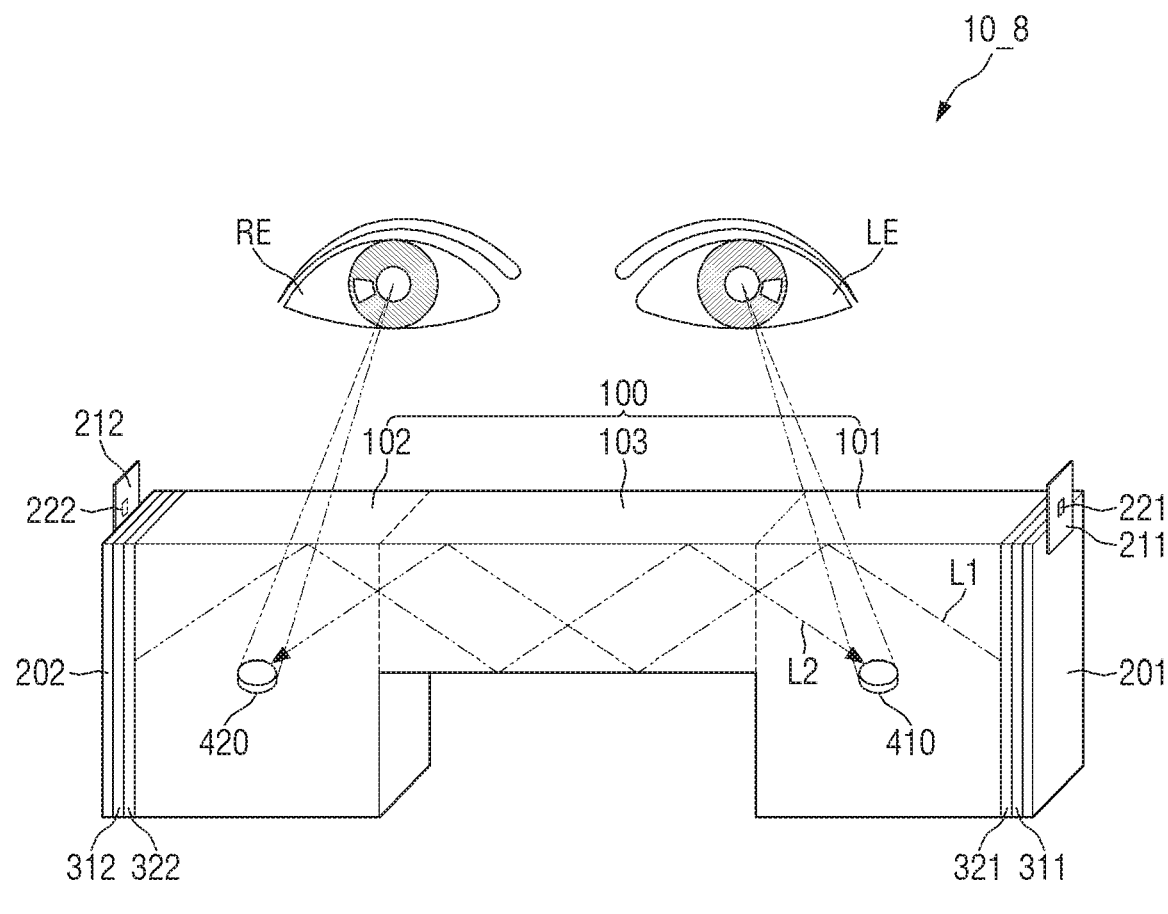
FIG. 17 is a perspective view showing an example of paths of a first light of a first display device and a second light of a second display device.

FIG. 15 is a perspective view showing an optical device 10_8 according to an embodiment. FIG. 16 is a perspective view showing an example of a lens 100 of the optical device 10_8 of FIG. 15. FIG. 17 is a perspective view showing an example of paths of a first light of a first display device and a second light of a second display device.

Referring to FIGS. 15-17, the optical device 10_8 according to an embodiment includes a lens 100, a first display device 201, a second display device 202, a first optical path changing layer 311, a second optical path changing layer 312, a first polarizing film 321, a second polarizing film 322, a first reflector 410, and a second reflector 420.

The lens 100 may be formed of glass or plastic in a transparent or translucent manner. Accordingly, the user can view the real image through the lens 100. The lens 100 may have a refractive power (e.g., a predetermined refractive power) in consideration of the visual acuity of the user.

As shown in FIG. 16, the lens 100 may include a first lens portion 101, a second lens portion 102, and a third lens portion 103 disposed between the first lens portion 101 and the second lens portion 102. The first lens portion 101 may be formed as a hexahedron having an eleventh surface SF11, a twelfth surface SF12, an eleventh side surface SIF11, a twelfth side surface SIF12, a thirteenth side surface SIF13, and a fourteenth side surface SIF14, which each have a rectangular shape. The second lens portion 102 may be formed as a hexahedron having a twenty-first surface SF21, a twenty-second surface SF22, a twenty-first side surface SIF21, a twenty-second side surface SIF22, a twenty-third side surface SIF23, and a twenty-fourth side surface SIF24, which each have a rectangular shape. The third lens portion 103 may be formed as a hexahedron having a thirty-first surface SF31, a thirty-second surface SF32, a thirty-first side surface SIF31, a thirty-second side surface SIF32, a thirty-third side surface SIF33, an a thirty-fourth side surface SIF34, which each have a rectangular shape.

The twelfth side surface SIF12 of the first lens portion 101 may extend from one side of the eleventh side surface SIF11, and the thirteenth side surface SIF13 may extend from the other side opposite to the one side of the eleventh side surface SIF11. The fourteenth side surface SIF14 may face the eleventh side surface SIF11. The eleventh surface SF11 may be a top surface, and the twelfth surface SF12 may be a bottom surface. The eleventh surface SF11, which is a surface on which a user's left eye LE is located (or a surface near or adjacent the left eye LE of the user), may be an exit surface from which the light of the second display device 202 is emitted by the first reflector 410. The twelfth surface SF12 may be an outer surface of the lens 100.

The twenty-second side surface SIF22 of the second lens portion 102 may extend from one side of the twenty-first side surface SIF21, and the twenty-third side surface SIF23 may extend from the other side opposite to the one side of the twenty-first side surface SIF21. The twenty-fourth side surface SIF24 may face the twenty-first side surface SIF21. The twenty-first surface SF21 may be a top surface, and the twenty-second surface SF22 may be a bottom surface. The twenty-first surface SF21, which is a surface on which a user's right eye RE is located (or a surface near or adjacent the right eye RE of the user), may be an exit surface from which the light of the first display device 201 is emitted by the second reflector 420. The twenty-second surface SF22 may be an outer surface of the lens 100.

The thirty-second side surface SIF32 of the third lens portion 103 may extend from one side of the thirty-first side surface SIF31, and the thirty-third side surface SIF33 may extend from the other side opposite to the one side of the thirty-first side surface SIF31. The thirty-fourth side surface SIF34 may face the thirty-first side surface SIF31. The thirty-first surface SF31 may be a top surface, and the thirty-second surface SF32 may be a bottom surface.

The fourteenth side surface SIF14 of the first lens portion 101 may be in contact with the thirty-third side surface SIF33 of the third lens portion 103. The twenty-fourth surface SIF24 of the second lens portion 102 may be in contact with the thirty-fourth side surface SIF34 of the third lens portion 103.

Although FIG. 16 illustrates that the first lens portion 101, the second lens portion 102 and the third lens portion 103 of the lens 100 are formed as a hexahedron, the embodiments of the present disclosure are not limited thereto. For example, each of the first lens portion 101, the second lens portion 102 and the third lens portion 103 of the lens 100 may be formed as a polyhedron having a first surface, a second surface and side surfaces, which are polygonal. In addition to the polyhedron, each of the first lens portion 101, the second lens portion 102 and the third lens portion 103 of the lens 100 may be formed in other suitable shapes, such as a cylinder, an elliptic cylinder, a semicircular cylinder, a semi-elliptic cylinder, a distorted cylinder, or a distorted semicircular cylinder. The distorted cylinder and the distorted semicircular cylinder refer to a cylinder and a semicircular cylinder having a non-constant diameter.

The first reflector 410 is disposed in the first lens portion 101 of the lens 100. The second reflector 420 is disposed in the second lens portion 102 of the lens 100. The first reflector 410 and the second reflector 420 may be small mirrors, such as pin mirrors. Although FIG. 15 illustrates that the first reflector 410 and the second reflector 420 have a circular cross section, they may have any suitable shape, such as an elliptical or polygonal cross section.

The first reflector 410 and the second reflector 420 are formed to be smaller in size than the pupil of the eye E. For example, each of the first reflector 410 and the second reflector 420 may be formed to have a diameter of about 500 μm to about 4 mm. In embodiments, because the user focuses on the real image, it is difficult to recognize the first reflector 410 and the second reflector 420. However, as the size of the first reflector 410 and the second reflector 420 decreases, the luminance of the virtual image provided to the user's eye E by the flexible display device 200 also decreases. Thus, in consideration of this fact, the size of the first reflector 410 and the second reflector 420 may be set.

The first reflector 410 and the second reflector 420 may have a cylindrical shape, as shown in FIG. 15. In embodiments, one of the two bottom surfaces may be a reflecting surface implemented as a mirror, and the other one of the two bottom surfaces and the side surface are not implemented as a mirror. In order to emit the light L totally reflected from the thirty-first side surface SIF31 of the third lens portion 103 of the lens 100 to the eleventh surface SF11 of the first lens portion 101, the bottom surface of an upper portion of the first reflector 410 may be a reflecting surface, as shown in FIG. 15. Further, in order to emit the light L totally reflected from the thirty-first side surface SIF31 of the third lens portion 103 of the lens 100 to the twenty-first surface SF21 of the second lens portion 102, the bottom surface of an upper portion of the second reflector 420 may be a reflecting surface, as shown in FIG. 15.

The first reflector 410 may reflect the virtual image displayed on the second display device 202 and provide the virtual image to the user's left eye LE. The second reflector 420 may reflect the virtual image displayed on the first display device 201 and provide the virtual image to the user's right eye RE. Because the virtual image displayed on the first display device 201 is reflected by the second reflector 420, its depth of field is deepened. Because the virtual image displayed on the second display device 202 is reflected by the first reflector 410, its depth of field is deepened.

Each of the first display device 201 and the second display device 202 displays the virtual image for realizing the augmented reality. The first display device 201 may be disposed on one of the side surfaces of the first lens portion 101 and the second display device 202 may be disposed on one of the side surfaces of the second lens portion 102. For example, the display device 200 may be disposed on the eleventh side surface SIF11 of the first lens portion 101 and disposed on the twenty-first side surface SIF21 of the second lens portion 102.

A first circuit board 211 is attached to one end of the first display device 201. Alternatively, the first circuit board 211 may be attached to the other end of the first display device 201. Alternatively, when there are many signal lines and voltage lines for driving the first display device 201, two first circuit boards 211 may be attached to one end and the other end of the first display device 201, respectively.

A second circuit board 212 is attached to one end of the second display device 202. Alternatively, the second circuit board 212 may be attached to the other end of the second display device 202. Alternatively, when there are many signal lines and voltage lines for driving the second display device 202, two second circuit boards 212 may be attached to one end and the other end of the second display device 202, respectively.

Each of the first circuit board 211 and the second circuit board 212 may be a flexible printed circuit board.

A first integrated drive circuit 221 may be mounted on the first circuit board 211. A second integrated drive circuit 222 may be mounted on the second circuit board 212. The first integrated drive circuit 221 may supply the first display device 201 with data voltages, scan control signals, a source voltage, and the like for driving the first display device 201. The second integrated drive circuit 222 may supply the second display device 202 with data voltages, scan control signals, a source voltage, and the like for driving the second display device 202. The first integrated drive circuit 221 and the second integrated drive circuit 222 may be integrated circuits.

The first optical path changing layer 311 may be disposed between the eleventh side surface SIF11 of the first lens portion 101 and the first display device 201. The first optical path changing layer 311 may change the path of the first light L1 such that the first light L1 of the first display device 201 incident on the eleventh side surface SIF11 of the first lens portion 101 travels toward the twelfth side surface SIF12 of the first lens portion 101, as shown in FIG. 15.

The second optical path changing layer 312 may be disposed between the twenty-first side surface SIF21 of the second lens portion 102 and the second display device 202. The second optical path changing layer 312 may change the path of the second light L2 such that the second light L2 of the second display device 202 incident on the twenty-first side surface SIF21 of the second lens portion 102 travels toward the twenty-second side surface SIF22 of the second lens portion 102, as shown in FIG. 15.

The first optical path changing layer 311 and the second optical path changing layer 312 may be implemented as described above with reference to FIGS. 4A-4C.

The first polarizing film 321 may be disposed between the eleventh side surface SIF11 of the first lens portion 101 and the first optical path changing layer 311. The second polarizing film 322 may be disposed between the twenty-first side surface SIF21 of the second lens portion 102 and the second optical path changing layer 312.

Each of the first polarizing film 321 and the second polarizing film 322 may include a phase retardation film such as a linear polarizer plate and a quarter-wave ($\lambda$/4) plate. In the case of the first polarizing film 321, the linear polarizer plate may be disposed on the eleventh side surface SIF11 of the first lens portion 101, and the phase retardation film may be disposed between the linear polarizer plate and the first optical path changing layer 311. Accordingly, the first polarizing film 321 can prevent the light from the eleventh side surface SIF11 of the first lens portion 101 from being reflected by the first display device 201 and emitted to the eleventh side surface SIF11 of the first lens portion 101, or can reduce the likelihood thereof, while allowing the first light L1 of the first display device 201 to travel to the eleventh side surface SIF11 of the first lens portion 101.

In embodiments including the second polarizing film 322, the linear polarizer plate may be disposed on the twenty-first side surface SIF21 of the second lens portion 102, and the phase retardation film may be disposed between the linear polarizer plate and the second optical path changing layer 312. Accordingly, the second polarizing film 322 can prevent the light from the twenty-first side surface SIF21 of the second lens portion 102 from being reflected by the second display device 202 and emitted to the twenty-first side surface SIF21 of the second lens portion 102, or reduce the likelihood thereof, while allowing the second light L2 of the second display device 202 to travel to the twenty-first side surface SIF21 of the second lens portion 102.

As shown in FIG. 17, the first light L1 of the first display device 201 may travel toward the twelfth side surface SIF12 of the first lens portion 101 by the first optical path changing layer 311. When the refractive index of the lens 100 is larger than the refractive index of air and the incident angle of the first light L1 incident on the twelfth side surface SIF12 of the first lens portion 101 is larger than the critical angle, a part of the first light L1 of the first display device 201 may be totally reflected by the twelfth side surface SIF12 of the first lens portion 101. A part of the first light L1 totally reflected by the twelfth side surface SIF12 of the first lens portion 101 may be totally reflected by the thirty-second side surface SIF32 of the third lens portion 103. A part of the first light L1 totally reflected by the thirty-second side surface SIF32 of the third lens portion 103 may be totally reflected by the thirty-first side surface SIF31 of the third lens portion 103. A part of the first light L1 totally reflected by the thirty-first side surface SIF31 of the third lens portion 103 may be emitted to the twenty-first surface SF21 of the second lens portion 102 by the second reflector 420 and provided to the user's right eye RE.

Further, as shown in FIG. 17, the second light L2 of the second display device 202 may travel toward the twenty-second side surface SIF22 of the second lens portion 102 by the second optical path changing layer 312. When the refractive index of the lens 100 is larger than the refractive index of air and the incident angle of the second light L2 incident on the twenty-second side surface SIF22 of the second lens portion 102 is larger than the critical angle, a part of the second light L2 of the second display device 202 may be totally reflected by the twenty-second side surface SIF22 of the second lens portion 102. A part of the second light L2 totally reflected by the twenty-second side surface SIF22 of second lens portion 102 may be totally reflected by the thirty-second side surface SIF32 of the third lens portion 103. A part of the second light L2 totally reflected by the thirty-second side surface SIF32 of the third lens portion 103 may be totally reflected by the thirty-first side surface SIF31 of the third lens portion 103. A part of the second light L2 totally reflected by the thirty-first side surface SIF31 of the third lens portion 103 may be emitted to the eleventh surface SF11 of the first lens portion 101 by the first reflector 410 and provided to the user's left eye LE.

FIG. 17 illustrates that after the first light L1 of the first display device 201 is totally reflected three times, e.g., by the twelfth side surface SIF12 of the first lens portion 101 and the thirty-first side surface SIF31 and the thirty-second side surface SIF32 of the third lens portion 103, the first light L1 is reflected by the second reflector 420, emitted to the twenty-first surface SF21 of the second lens portion 102, and provided to the user's right eye RE. Further, FIG. 17 illustrates that after the second light L2 of the second display device 202 is totally reflected three times, e.g., by the twenty-second side surface SIF22 of the second lens portion 102 and the thirty-first side surface SIF31 and the thirty-second side surface SIF32 of the third lens portion 103, the second light L2 is reflected by the first reflector 410, emitted to the eleventh surface SF11 of the first lens portion 101, and provided to the user's left eye LE. However, the number of total reflections of the first light L1 of the first display device 201 and the number of total reflections of the second light L2 of the second display device 202 are not limited thereto. As the number of total reflections of the first light L1 of the first display device 201 increases, the depth of the virtual image displayed on the first display device 201 may be deepened. However, because the loss of the first light L1 of the first display device 201 increases, the luminance of the virtual image of the first display device 201 provided to the user's right eye RE may be reduced. As the number of total reflections of the second light L2 of the second display device 202 increases, the depth of the virtual image displayed on the second display device 202 may be deepened. However, because the loss of the second light L2 of the second display device 202 increases, the luminance of the virtual image of the second display device 202 provided to the user's left eye LE may be reduced. Thus, the number of total reflections of the first light L1 of the first display device 201 and the number of total reflections of the second light L2 of the second display device 202 may be set in consideration of the depths of field of the virtual images displayed on the first display device 201 and the second display device 202, the luminance of the virtual image of the first display device 201 provided on the user's right eye RE and the luminance of the virtual image of the second display device 202 provided in the user's left eye LE.

Meanwhile, in order for the first light L1 of the first display device 201 and the second light L2 of the second display device 202 to be totally reflected at the first side surface SIF1 and the second side surface SIF2 of the third lens portion 103, the length of the third lens portion 103 in the first direction (X-axis direction) may be longer than the length of the first lens portion 101 in the first direction (X-axis direction) and the length of the second lens portion 102 in the first direction (X-axis direction).

According to the embodiment shown in FIGS. 15-17, after the first light L1 of the first display device 201 disposed on the eleventh side surface SIF11 of the first lens portion 101 is totally reflected by at least one side surface of the third lens portion 103 connecting the first lens portion 101 and the second lens portion 102, the first light L1 may be emitted to the twenty-first surface SF21 of the second lens portion 102 by the second reflector 420 disposed in the second lens portion 102, and provided to the user's right eye RE. Further, after the second light L2 of the second display device 202 disposed on the twenty-first side surface SIF21 of the second lens portion 102 is totally reflected by at least one side surface of the third lens portion 103, the second light L2 may be emitted to the eleventh surface SF11 of the first lens portion 101 by the first reflector 410 disposed in the first lens portion 101, and provided to the user's left eye LE. Thus, the optical distance between the first display device 201 and the second reflector 420 and the optical distance between the second display device 202 and the first reflector 410 can be increased. Therefore, the depth of field of the virtual image displayed on the first display device 201 and the depth of field of the virtual image displayed on the second display device 202 can be deepened.

Figure 18A:
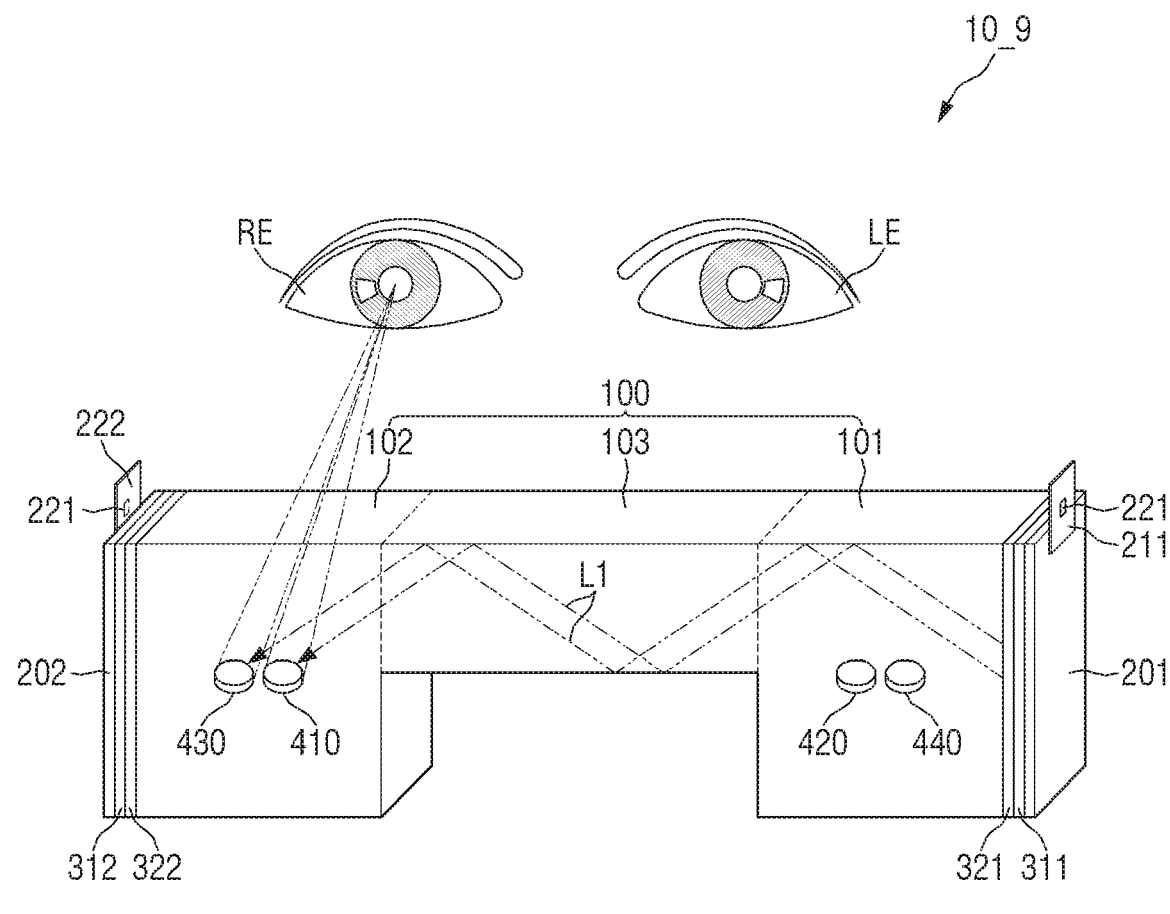
FIGS. 18A-18B are perspective views showing an optical device according to an embodiment.
Figure 18B:
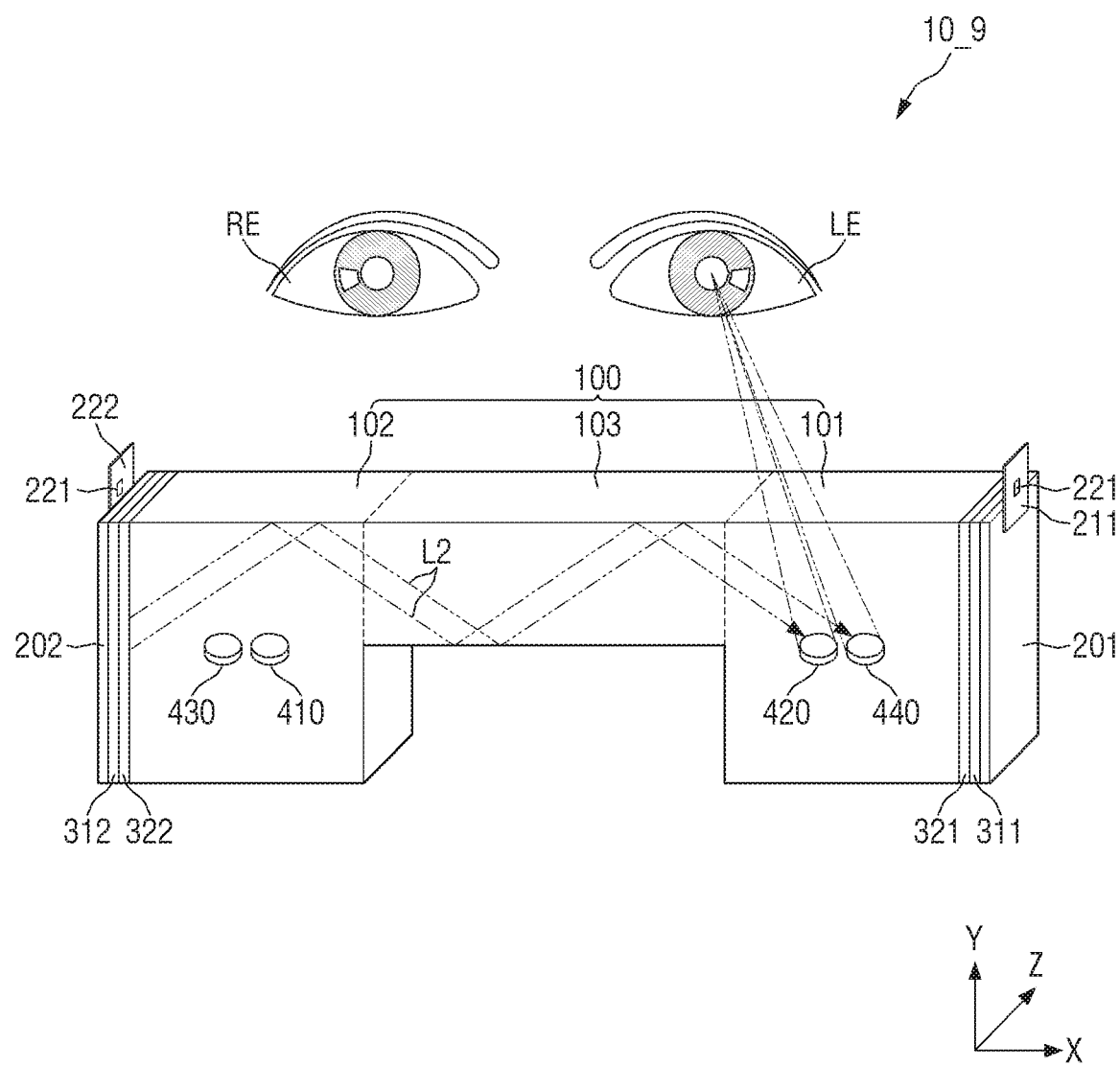

FIGS. 18A-18B are perspective views showing an optical device 10_9 according to an embodiment.

The embodiment shown in FIGS. 18A-18B differs from the embodiment shown in FIGS. 15-17 in that the optical device 10_9 further includes a third reflector 430 disposed adjacent to the first reflector 410 and a fourth reflector 440 disposed adjacent to the second reflector 420. A description overlapping with the embodiment described above with reference to FIGS. 15-17 may be omitted, and differences from the embodiment shown in FIGS. 15-17 are mainly described with reference to FIGS. 18A-18B.

Referring to FIGS. 18A-18B, the optical device 10_9 further includes the third reflector 430 disposed adjacent to the first reflector 410 and the fourth reflector 440 disposed adjacent to the second reflector 420. Meanwhile, the number of reflectors of the optical device 10_9 is not limited to that shown in FIGS. 18A-18B. As the number of reflectors in the optical device 10_9 increases, the luminance of the virtual image provided to the user's left eye LE and the user's right eye RE may increase, and the area of the display device 200 viewed by the user's left eye LE and the user's right eye RE, e.g., the field of view (FOV) of the user, may be enlarged.

The third reflector 430 is disposed in the first lens portion 101 of the lens 100. The fourth reflector 440 is disposed in the second lens portion 102 of the lens 100. The third reflector 430 and the fourth reflector 440 may be small mirrors, such as pin mirrors. Although FIGS. 18A-18B illustrate that the third reflector 430 and the fourth reflector 440 have a circular cross section, the third reflector 430 and the fourth reflector 440 may have any suitable shape, such as an elliptical or polygonal cross section.

The third reflector 430 and the fourth reflector 440 are formed to be smaller in size than the pupil of the eye E. For example, each of the third reflector 430 and the fourth reflector 440 may be formed to have a diameter of about 500 μm to about 4 mm. In embodiments, because the user focuses on the real image, it is difficult to recognize the third reflector 430 and the fourth reflector 440. However, as the size of the third reflector 430 and the fourth reflector 440 decreases, the luminance of the virtual image provided to the user's eye E by the flexible display device 200 also decreases. Thus, in consideration of this fact, the size of the third reflector 430 and the fourth reflector 440 may be set.

The third reflector 430 and the fourth reflector 440 may have a cylindrical shape, as shown in FIGS. 18A-18B. In embodiments, one of the two bottom surfaces may be a reflecting surface implemented as a mirror, and the other one of the two bottom surfaces and the side surface are not implemented as a mirror. In order to emit the light L totally reflected from the thirty-first side surface SIF31 of the third lens portion 103 of the lens 100 to the eleventh surface SF11 of the first lens portion 101, the bottom surface of an upper portion of the third reflector 430 may be a reflecting surface, as shown in FIGS. 18A-18B. Further, in order to emit the light L totally reflected from the thirty-first side surface SIF31 of the third lens portion 103 of the lens 100 to the twenty-first surface SF21 of the second lens portion 102, the bottom surface of an upper portion of the fourth reflector 440 may be a reflecting surface, as shown in FIGS. 18A-18B.

The third reflector 430 may reflect the virtual image displayed on the second display device 202 and provide it to the user's left eye LE. The fourth reflector 440 may reflect the virtual image displayed on the first display device 201 and provide it to the user's right eye RE. Because the virtual image displayed on the first display device 201 is reflected by the fourth reflector 440, the depth of field is deepened. Because the virtual image displayed on the second display device 202 is reflected by the third reflector 430, the depth of field is deepened.

As shown in FIG. 18A, the first light L1 of the first display device 201 may travel toward the twelfth side surface SIF12 of the first lens portion 101 by the first optical path changing layer 311. When the refractive index of the lens 100 is larger than the refractive index of air and the incident angle of the first light L1 incident on the twelfth side surface SIF12 of the first lens portion 101 is larger than the critical angle, a part of the first light L1 of the first display device 201 may be totally reflected by the twelfth side surface SIF12 of the first lens portion 101. A part of the first light L1 totally reflected by the twelfth side surface SIF12 of the first lens portion 101 may be totally reflected by the thirty-second side surface SIF32 of the third lens portion 103. A part of the first light L1 totally reflected by the thirty-second side surface SIF32 of the third lens portion 103 may be totally reflected by the thirty-first side surface SIF31 of the third lens portion 103. A part of the first light L1 totally reflected by the thirty-first side surface SIF31 of the third lens portion 103 may be emitted to the twenty-first surface SF21 of the second lens portion 102 by the second reflector 420 and the fourth reflector 440 and provided to the user's right eye RE.

Further, as shown in FIG. 18B, the second light L2 of the second display device 202 may travel toward the twenty-second side surface SIF22 of the second lens portion 102 by the second optical path changing layer 312. When the refractive index of the lens 100 is larger than the refractive index of air and the incident angle of the second light L2 incident on the twenty-second side surface SIF22 of the second lens portion 102 is larger than the critical angle, a part of the second light L2 of the second display device 202 may be totally reflected by the twenty-second side surface SIF22 of the second lens portion 102. A part of the second light L2 totally reflected by the twenty-second side surface SIF22 of second lens portion 102 may be totally reflected by the thirty-second side surface SIF32 of the third lens portion 103. A part of the second light L2 totally reflected by the thirty-second side surface SIF32 of the third lens portion 103 may be totally reflected by the thirty-first side surface SIF31 of the third lens portion 103. A part of the second light L2 totally reflected by the thirty-first side surface SIF31 of the third lens portion 103 may be emitted to the eleventh surface SF11 of the first lens portion 101 by the first reflector 410 and the third reflector 430 and provided to the user's left eye LE.

According to the embodiment shown in FIGS. 18A-18B, because each of the first lens portion 101 and the second lens portion 102 includes the plurality of reflectors, the luminance of the virtual image provided to the user's left eye LE and the user's right eye RE can be increased as compared with embodiments where one reflector is provided, and the area of the display device 200 viewed by the user's left eye LE and the user's right eye RE, e.g., the field of view (FOV) of the user, can be enlarged.

Figure 19:
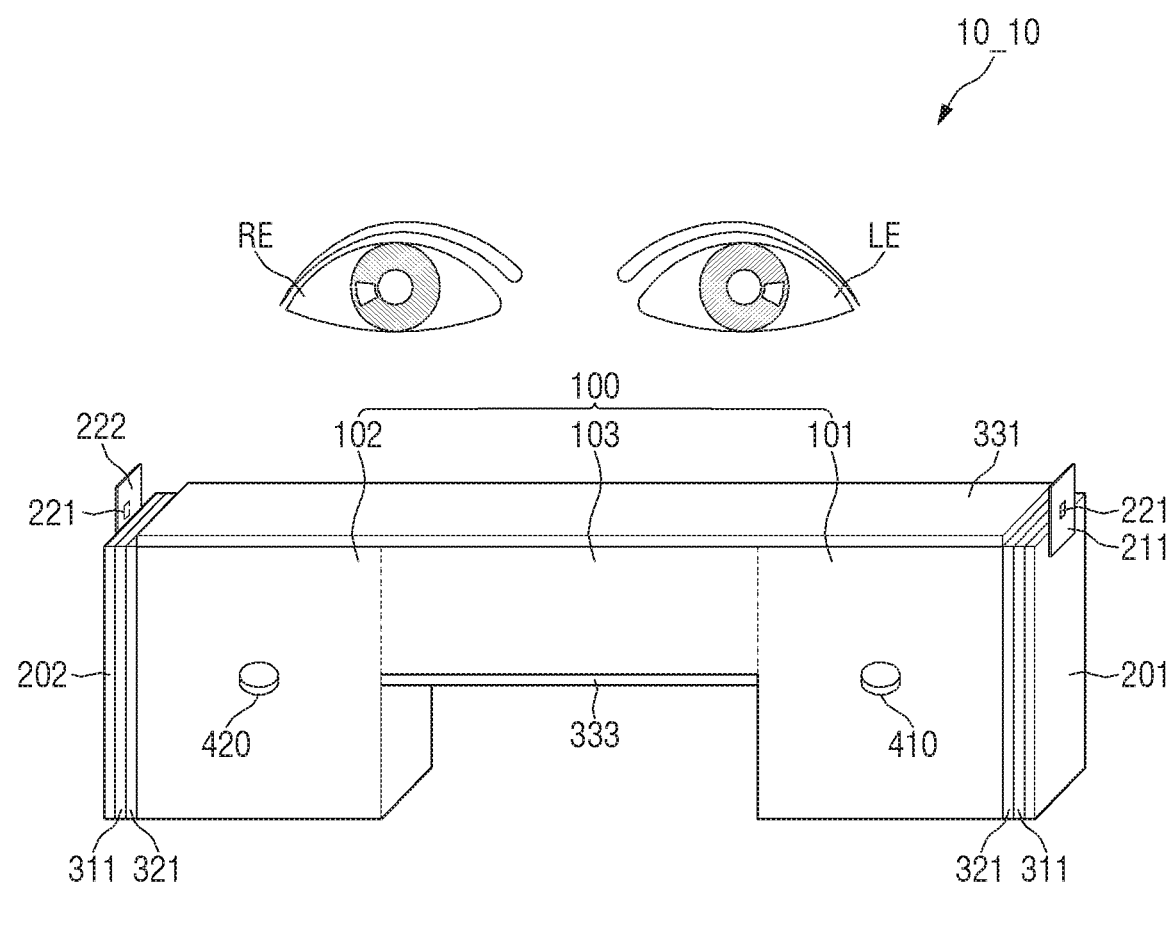
FIG. 19 is a perspective view showing an optical device according to an embodiment.

FIG. 19 is a perspective view showing an optical device 10_10 according to an embodiment.

The embodiment shown in FIG. 19 differs from the embodiment shown in FIGS. 15-17 in that a first reflective sheet 331 is disposed on the twelfth side surface SIF12 of the first lens portion 101, the twenty-second side surface SIF22 of the second lens portion 102 and the thirty-first side surface SIF31 of the third lens portion 103, and a second reflective sheet 333 is disposed on the thirty-second side surface SIF32 of the third lens portion 103. A description overlapping with the embodiment described above with reference to FIGS. 15-17 may be omitted, and differences from the embodiment shown in FIGS. 15-17 are mainly described with reference to FIG. 19.

Referring to FIG. 19, the optical device 10_10 further includes the first reflective sheet 331 disposed on the twelfth side surface SIF12 of the first lens portion 101, the twenty-second side surface SIF22 of the second lens portion 102 and the thirty-first side surface SIF31 of the third lens portion 103, and the second reflective sheet 333 disposed on the thirty-second side surface SIF32 of the third lens portion 103. The twelfth side surface SIF12 of the first lens portion 101, the twenty-second side surface SIF22 of the second lens portion 102, and one surface of the first reflective sheet 331 facing the thirty-first side surface SIF31 of the third lens portion 103 may be implemented as mirrors. One surface of the second reflective sheet 333 facing the thirty-second side surface SIF32 of the third lens portion 103 may be implemented as a mirror.

The first light L1 of the first display device 201 may travel toward the twelfth side surface SIF12 of the first lens portion 101 by the first optical path changing layer 311. The first light L1 of the first display device 201 may be reflected by the first reflective sheet 331 disposed on the twelfth side surface SIF12 of the first lens portion 101. A part of the first light L1 reflected by the first reflective sheet 331 disposed on the twelfth side surface SIF12 of the first lens portion 101 may be reflected by the second reflective sheet 333 disposed on the thirty-second side surface SIF32 of the third lens portion 103. A part of the first light L1 reflected by the second reflective sheet 333 disposed on the thirty-second side surface SIF32 of the third lens portion 103 may be reflected by the first reflective sheet 331 disposed on the thirty-first side surface SIF31 of the third lens portion 103. A part of the first light L1 reflected by the first reflective sheet 331 disposed on the thirty-first side surface SIF31 of the third lens portion 103 may be emitted to the twenty-first surface SF21 of the second lens portion 102 by the second reflector 420 and provided to the user's right eye RE.

Further, the second light L2 of the second display device 202 may travel toward the twenty-second side surface SIF22 of the second lens portion 102 by the second optical path changing layer 312. A part of the second light L2 of the second display device 202 may be reflected by the first reflective sheet 331 disposed on the twenty-second side surface SIF22 of the second lens portion 102. A part of the second light L2 reflected by the first reflective sheet 331 disposed on the twenty-second side surface SIF22 of the second lens portion 102 may be reflected by the second reflective sheet 333 disposed on the thirty-second side surface SIF32 of the third lens portion 103. A part of the second light L2 reflected by the second reflective sheet 333 disposed on the thirty-second side surface SIF32 of the third lens portion 103 may be reflected by the first reflective sheet 331 disposed on the thirty-first side surface SIF31 of the third lens portion 103. A part of the second light L2 totally reflected by the thirty-first side surface SIF31 of the third lens portion 103 may be emitted to the eleventh surface SF11 of the first lens portion 101 by the first reflector 410 and provided to the user's left eye LE.

The total reflection occurs only when the incident angle is larger than the critical angle, whereas the first reflective sheet 331 and the second reflective sheet 333 reflect the incident light almost intact. Thus, in embodiments including the first reflective sheet 331 and the second reflective sheet 333, a ratio of the reflected light to the incident light can be increased as compared with embodiments including total reflection.

According to the embodiment shown in FIG. 19, the first light L1 of the first display device 201 and the second light L2 of the second display device 202 are reflected by the first reflective sheet 331 disposed on the twelfth side surface SIF12 of the first lens portion 101, the twenty-second side surface SIF22 of the second lens portion 102 and the thirty-first side surface SIF31 of the third lens portion 103, and the second reflective sheet 333 disposed on the thirty-second side surface SIF32 of the third lens portion 103. The luminance of the virtual images of the first display device 201 and the second display device 202 provided to the user's left eye LE and right eye RE can be increased.

Figure 20:
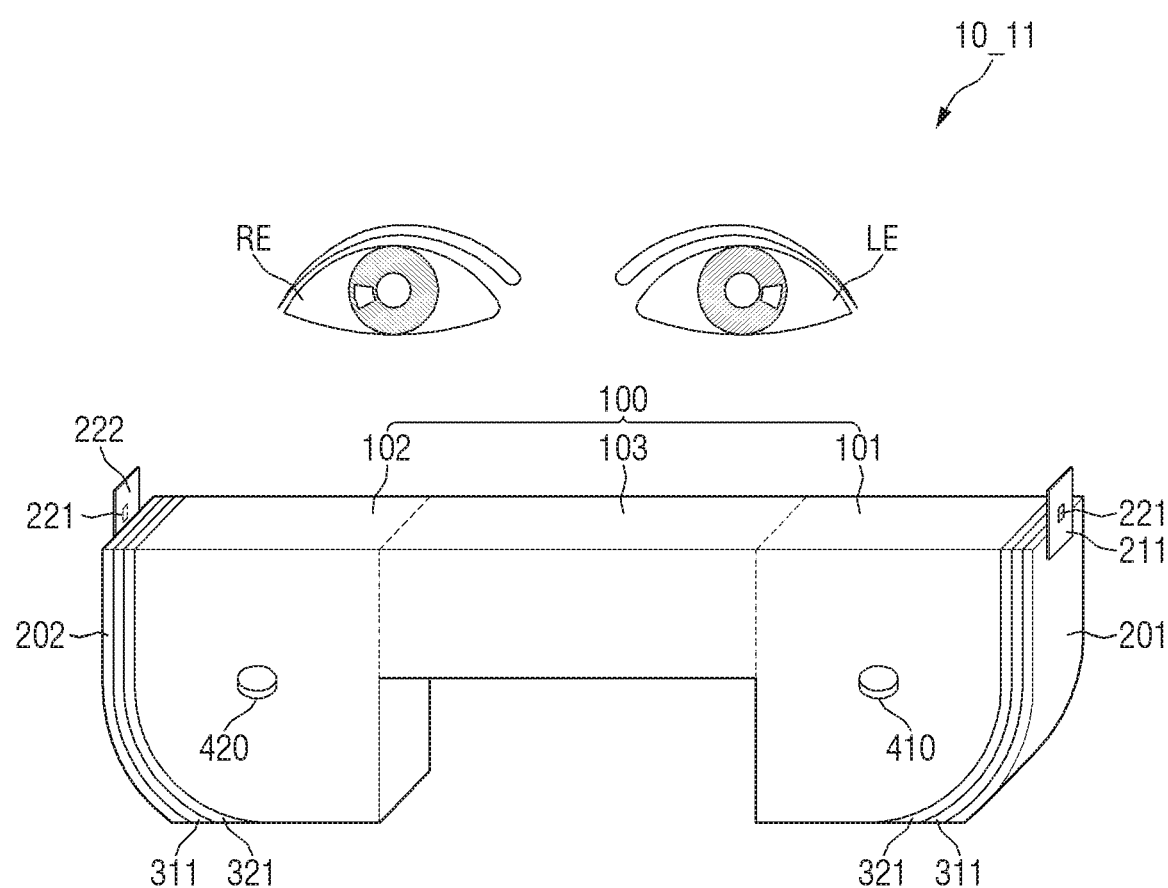
FIG. 20 is a perspective view showing an optical device according to an embodiment.

FIG. 20 is a perspective view showing an optical device 10_11 according to an embodiment.

The embodiment shown in FIG. 20 differs from the embodiment shown in FIGS. 15-17 in that the eleventh side surface SIF11 of the first lens portion 101 and the twenty-first side surface SIF21 of the second lens portion 102 are formed as a curved surface having a predetermined curvature. A description overlapping with the embodiment described above with reference to FIGS. 15-17 may be omitted, and differences from the embodiment shown in FIGS. 15-17 are mainly described with reference to FIG. 20.

Referring to FIG. 20, the eleventh side surface SIF11 of the first lens portion 101 and the twenty-first side surface SIF21 of the second lens portion 102 may be a curved surface, e.g., a curved surface having a predetermined curvature. The eleventh side surface SIF11 of the first lens portion 101 may have a curved shape in an outward direction (e.g., the first direction (X-axis direction)) of the eleventh side surface SIF11. The twenty-first side surface SIF21 of the second lens portion 102 may have a curved shape in an outward direction (e.g., a direction opposite to the first direction (X-axis direction)) of the twenty-first side surface SIF21. Accordingly, a part of the eleventh side surface SIF11 of the first lens portion 101 may face a part of the twelfth side surface SIF12. A part of the twenty-first side surface SIF21 of the second lens portion 102 may face a part of the twenty-second side surface SIF22.

The first display device 201 may be a flexible display device with flexibility, which can be bent. Thus, the first display device 201 may be disposed in a bent shape on the eleventh side surface SIF11 of the first lens portion 101 formed as a curved surface. Further, because a part of the eleventh side surface SIF11 of the first lens portion 101 may face a part of the twelfth side surface SIF12, the first light L1 of the first display device 201 may travel toward the twelfth side surface SIF12 without the first optical path changing layer 311 and may be totally reflected by the twelfth side surface SIF12. Therefore, the first optical path changing layer 311 may be omitted.

The second display device 202 may be a flexible display device with flexibility, which can be bent. Thus, the second display device 202 may be disposed in a bent shape on the twenty-first side surface SIF21 of the second lens portion 102 formed as a curved surface. Further, because a part of the twenty-first side surface SIF21 of the second lens portion 102 may face a part of the twenty-second side surface SIF22, the second light L2 of the second display device 202 may travel toward the twenty-second side surface SIF22 without the second optical path changing layer 312 and may be totally reflected by the twenty-second side surface SIF22. Therefore, the second optical path changing layer 312 may be omitted.

Although FIG. 20 illustrates that the eleventh side surface SIF1 of the first lens portion 101 and the twenty-first side surface SIF21 of the second lens portion 102 are formed as curved surfaces, the present disclosure is not limited thereto. For example, when the length of the thirteenth side surface SIF13 of the first lens portion 101 in the first direction (X-axis direction) is shorter than the length of the twelfth side surface SIF12 in the first direction (X-axis direction), the eleventh side surface SIF11 may be disposed obliquely such that a part of the eleventh side surface SIF11 of the first lens portion 101 may face a part of the twelfth side surface SIF12. The first light L1 of the first display device 201 may travel toward the twelfth side surface SIF12 without the first optical path changing layer 311 and may be totally reflected by the twelfth side surface SIF12. In embodiments, the eleventh side surface SIF11 of the first lens portion 101 may be formed as a flat surface rather than a curved surface.

Further, when the length of the twenty-third side surface SIF23 of the second lens portion 102 in the first direction (X-axis direction) is shorter than the length of the twenty-second side surface SIF22 in the first direction (X-axis direction), the twenty-first side surface SIF21 may be disposed obliquely such that a part of the twenty-first side surface SIF21 of the second lens portion 102 may face a part of the twenty-second side surface SIF22. The second light L2 of the second display device 202 may travel toward the twenty-second side surface SIF22 without the second optical path changing layer 312 and may be totally reflected by the twenty-second side surface SIF22. In embodiments, the twenty-first side surface SIF21 of the second lens portion 102 may be formed as a flat surface rather than a curved surface.

According to the embodiment shown in FIG. 20, each of the first display device 201 and the second display device 202 is formed as a flexible display device with flexibility. The first display device 201 may be disposed in a bent shape on the eleventh side surface SIF11 of the first lens portion 101 formed as a curved surface. The second display device 202 may be disposed in a bent shape on the twenty-first side surface SIF21 of the second lens portion 102 formed as a curved surface. Thus, the first light L1 of the first display device 201 may travel toward the twelfth side surface SIF12 without the first optical path changing layer 311 and may be totally reflected by the twelfth side surface SIF12. Further, the second light L2 of the second display device 202 may travel toward the twenty-second side surface SIF22 without the second optical path changing layer 312 and may be totally reflected by the twenty-second side surface SIF22.

Figure 21:
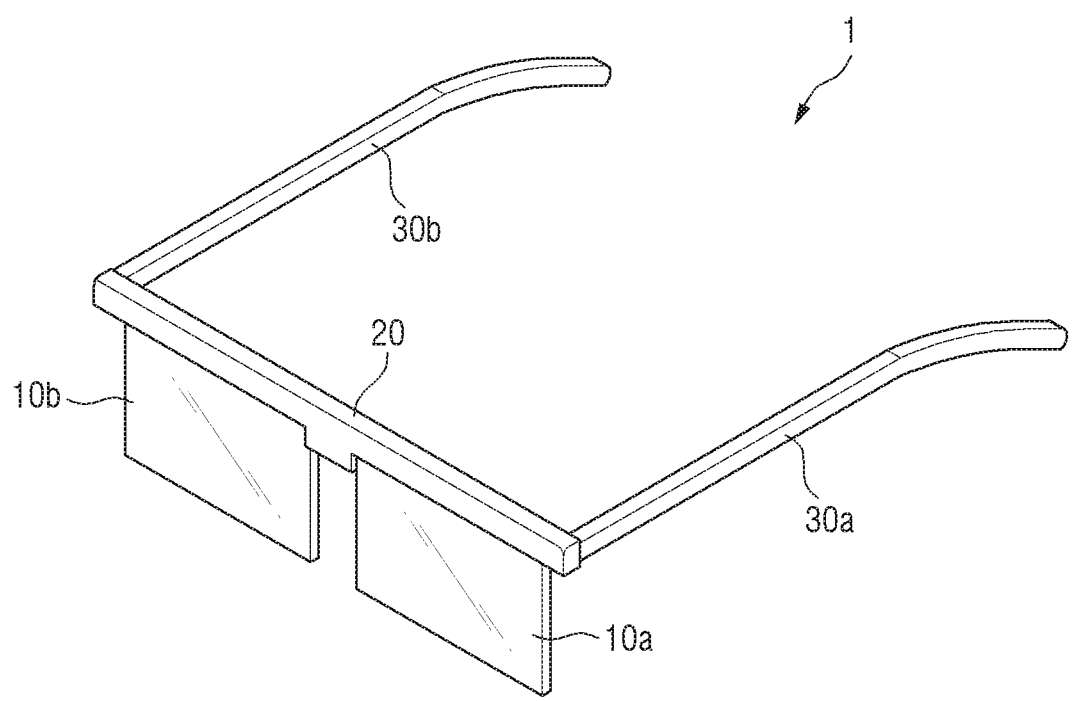
FIG. 21 is an exemplary diagram illustrating an eye glass-type display including an optical device according to various embodiments.

FIG. 21 is an exemplary diagram illustrating an eye glass-type display device 1 including an optical device according to various embodiments. FIG. 21 shows that optical devices 10a and 10b according to the embodiments of the present disclosure can be applied to the eyeglass-type display device 1.

Referring to FIG. 21, the eyeglass-type display device 1 may include a first optical device 10a, a second optical device 10b, a support frame 20, and eyeglass legs 30a and 30b. Although FIG. 21 illustrates the eyeglass-type display 1 including the eyeglass legs 30a and 30b, the optical devices 10a and 10b according to embodiments of the present disclosure may be applied to a head mounted display including a head mount band that can be mounted on the head instead of the eyeglass legs 30a and 30b, for example.

The example to which the optical device is applied is not limited to that shown in FIG. 21, but it can be applied in various forms to various other electronic devices.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An optical device comprising:
  a lens comprising a first surface and a plurality of side surfaces;
  a display device on a first side surface from among the plurality of side surfaces, the display device being configured to provide light to the first side surface;
  a first reflector in the lens and configured to reflect the light provided by the display device after the light is reflected from a second side surface from among the plurality of side surfaces to the first surface; and an optical path changing member between the first side surface and the display device, the optical path changing member being configured to change a path of the light provided by the display device such that the light provided by the display device travels toward a third side surface of the lens, wherein the light provided by the display device is reflected by the third side surface from among the plurality of side surfaces to travel toward a fourth side surface from among the plurality of side surfaces, and is reflected by the fourth side surface to travel toward the second side surface, wherein the third side surface extends from a first side of the first side surface, and wherein the fourth side surface is between the second side surface and the third side surface.

2. The optical device of claim 1, further comprising a polarizing film between the first side surface and the optical path changing member.

3. The optical device of claim 1, further comprising a reflective sheet on the second side surface, the third side surface and the fourth side surface.

4. The optical device of claim 1, wherein the first side surface has a curved shape, and wherein the display device has a bent shape on the first side surface.

5. The optical device of claim 1, further comprising a second reflector in the lens and configured to reflect the light provided by the display device after the light is reflected from the second side surface to the first surface.

6. The optical device of claim 1, wherein the optical path changing member comprises:
a base layer;
a first light exit surface inclined at a first angle from the base layer; and
a second light exit surface at a second angle from the base layer, the first angle being less than the second angle, and wherein the optical device further comprises:
a planarization layer on the optical path changing member and in contact with the first and second light exit surfaces, a refractive index of the planarization layer being different from a refractive index of the base layer.

7. An optical device comprising:
a lens comprising a first surface and a plurality of side surfaces;
a display device on a first side surface from among the plurality of side surfaces, the display device being configured to provide light to the first side surface;
a first reflector in the lens and configured to reflect the light provided by the display device after the light is reflected from a second side surface from among the plurality of side surfaces to the first surface; and
an optical path changing member between the first side surface and the display device and contacting the display device, the optical path changing member being configured to change a path of the light provided by the display device such that the light provided by the display device travels toward a second surface opposite to the first surface, wherein the first side surface and the second side surface face away from each other, wherein the first side surface has a curved shape, and wherein the display device has a bent shape corresponding to the curved shape the first side surface.

8. The optical device of claim 7, further comprising a reflective sheet on the second side surface of the lens.

9. The optical device of claim 8, wherein the second side surface is curved outwardly, and wherein the reflective sheet has a bent shape on the second side surface.

10. The optical device of claim 8, wherein the second side surface is curved toward a center of the lens, and wherein the reflective sheet has a bent shape on the second side surface.

11. The optical device of claim 7, wherein the light provided by the display device is incident on the first side surface, is reflected by the second surface to travel toward the first surface, is reflected by the first surface to travel toward the second side surface, is reflected by the second side surface to travel toward the first surface, and is reflected by the first surface to travel toward the first reflector.

12. An optical device comprising:
a lens comprising a first lens portion, a second lens portion, and a third lens portion, the third lens portion being between the first lens portion and the second lens portion;
a first display device on a first side surface of the first lens portion, the first display device being configured to provide a first light to the first side surface of the first lens portion;
a second display device on a first side surface of the second lens portion, the second display device being configured to provide a second light to the first side surface of the second lens portion;
a first reflector in the first lens portion and configured to reflect the second light reflected from a first side surface of the third lens portion to a first surface of the first lens portion; and
a second reflector in the second lens portion and configured to reflect the first light reflected from the first side surface of the third lens portion to a first surface of the second lens portion.

13. The optical device of claim 12, wherein the first light of the first display device is incident on the first side surface of the first lens portion, is reflected by a second side surface of the first lens portion to travel toward a second side surface of the third lens portion, is reflected by the second side surface of the third lens portion to travel toward the first side surface of the third lens portion, and is reflected by the first side surface of the third lens portion to travel toward the second reflector.

14. The optical device of claim 13, wherein the first side surface of the third lens portion is between the second side surface of the first lens portion and the second side surface of the second lens portion, and wherein the second side surface of the third lens portion is a surface opposite to the first side surface of the third lens portion.

15. The optical device of claim 14, further comprising a first reflective sheet on the second side surface of the first lens portion, the second side surface of the second lens portion and the first side surface of the third lens portion; and
a second reflective sheet on the second side surface of the third lens portion.

16. The optical device of claim 13, further comprising a first optical path changing member between the first side surface of the first lens portion and the first display device, the first optical path changing member being configured to change a path of the first light of the first display device such that the first light of the first display device travels toward the second side surface of the first lens portion.

17. The optical device of claim 16, wherein the second light of the second display device is incident on the first side surface of the second lens portion, is reflected by the second side surface of the second lens portion to travel toward the second side surface of the third lens portion, is reflected by the second side surface of the third lens portion to travel toward the first side surface of the third lens portion, and is reflected by the first side surface of the third lens portion to travel toward the first reflector.

18. The optical device of claim 17, further comprising a second optical path changing member between the first side surface of the second lens portion and the second display device, the second optical path changing member being configured to change a path of the second light of the second display device such that the second light of the second display device travels toward the second side surface of the second lens portion.

19. The optical device of claim 12, wherein the first side surface of the first lens portion has a curved shape, and
wherein the first display device has a bent shape on the first side surface of the first lens portion.

20. The optical device of claim 12, wherein the first side surface of the second lens portion has a curved shape, and
wherein the second display device has a bent shape on the first side surface of the second lens portion.

\* \* \* \* \*